(12) United States Patent
Mizokawa

(10) Patent No.: US 6,230,111 B1
(45) Date of Patent: May 8, 2001

(54) CONTROL SYSTEM FOR CONTROLLING OBJECT USING PSEUDO-EMOTIONS AND PSEUDO-PERSONALITY GENERATED IN THE OBJECT

(75) Inventor: Takashi Mizokawa, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/129,853

(22) Filed: Aug. 6, 1998

(51) Int. Cl.$^7$ ..................................................... G06F 15/00
(52) U.S. Cl. ........................... 702/182; 706/23; 345/473; 345/957
(58) Field of Search ............................ 702/182; 345/474, 345/473, 957, 958; 706/23, 20, 16, 11

(56) References Cited

U.S. PATENT DOCUMENTS

| | | | |
|---|---|---|---|
| 5,367,454 | * 11/1994 | Kawamoto et al. | 345/326 |
| 5,676,551 | * 10/1997 | Knight et al. | 434/236 |
| 5,911,581 | * 6/1999 | Reynolds et al. | 434/236 |
| 5,987,415 | * 11/1999 | Breese et al. | 704/270 |

OTHER PUBLICATIONS

Sato J. Et Al; "Autonomous Behavior Control Of Virtual Actors Based on the AIR Model"; Proceedings Computer Animation '97, Geneva, Switzerland, Jun. 1997.*

Bates J: "The role of emotion in believable agents" Communications of the ACM USA vol. 37, No. 7, pp. 122–125, Jul. 1994.*

Gomi Et Al; "Artificial Emotions as Emergent Phonomena"; IEEE International Workshope on Robert and Human Communication, Jul. 1993.*

Shibata T Et Al; "Spontaneous Behavior of Robots for Cooperation–Emotionally Itelligent Robot System"; Proceedings of the 1996 IEEE International Conference on Robotics and Automation, Apr. 1996.*

Juan David Velasques, Cathexis: A Computational Model for the Generation Emotions and their Influence in the Behavior of Autonomous Agents, Massachusetts Institute of Technology, Sep. 1996.

Hirohide Ushida, et al., Emotion Model for Life–like Agent and Its Evaluation, American Association for Artificial Intelligence, 1998.

* cited by examiner

Primary Examiner—Kamini Shah
(74) Attorney, Agent, or Firm—Knobbe, Martens, Olson & Bear, LLP

(57) ABSTRACT

An autonomous device behaving adaptively to a user includes a sensing unit; a recognition unit for recognizing user's command, a current user-related status, and a current user-unrelated status based on the sensed signals; a pseudo-personality-forming unit for establishing a pseudo-personality based on the result of the preceding recognition; a pseudo-emotion-forming unit for establishing pseudo-emotions based on the result of the preceding recognition and the pseudo-personality; an autonomous behavior-establishing unit for selecting autonomous behavior based on the result of the preceding recognition, the pseudo-personality, and the pseudo-emotions; a commanded behavior-establishing unit for constituting commanded behavior in accordance with the user's command; a behavior control unit for controlling behavior by combining the autonomous behavior and the commanded behavior; and an output device outputting the controlled behavior. The device comes to be viewed as a "pet" or a "friend" with the passage of time.

12 Claims, 19 Drawing Sheets

CONTROL SYSTEM FOR CONTROLLING OBJECT USING PSEUDO-EMOTIONS AND PSEUDO-PERSONALITY GENERATED IN THE OBJECT

BACKGROUND OF THE INVENTION

This invention relates to a system for controlling an object interacting with a user and environment, and particularly to that for adapting, to a user, behavior of an object capable of behaving in an autonomous manner, thereby creating behavior highly responsive to the user or environment.

Heretofore, various controlling methods have been available for controlling an object in accordance with a user's demands.

In such controlling methods, normally, the user sets a desired target value at output, and the object is controlled in such a way that the output matches the target value, while feeding the output back to a control system which compares the feedback and the target value to adjust the output. In the above, by feeding the output back to the system to adjust the output, the output of the object to be controlled can approach the target value, thereby achieving control satisfying the user's preferences.

If a target value is inputted by the user, it is relatively easy to obtain output close to the user's preferences. For example, a temperature of air controlled by an air conditioner is an easy object because the relationship between output (cooling or heating air) and a target value (temperature) is simple, and thus anyone can set a thermostat of the air conditioner at a target value. However, if the relationship between output and a target value is complicated, especially in a control system wherein changing a target value affects not only one output but also other outputs, only a skilled person can change the target value.

Further, since humans have emotions and such emotions affect momentary preferences, for example, even if an object or device is designed specifically for one individual user, it would be difficult to control the object in such a way as to always satisfy the user.

In the above conventional control system, output from the object is designed to always approach the target value. Thus, the longer the object is used, the easier the prediction of behavioral patterns becomes for the user. If the user can predict the output from the object, the object cannot be used for creative assistance to the user's intellectual work or desire.

SUMMARY OF THE INVENTION

An objective of the present invention is to solve the above problems associated with conventional control systems, and to provide a control system which allows outputting an adequate value ultimately giving the user more satisfaction than does a value obtained from the user's direct order, particularly using pseudo-emotions and a pseudo-personality generated in the object in response to the user and environment. The object can develop with respect to individuality in accordance with the user or with use by the user.

One important aspect of the present invention attaining the above objective is to provide to an autonomous device behaving adaptively to a user, comprising: (a) a sensing unit which senses signals of the user's command and predetermined signals relevant to accomplishment of the command but not part of the command, said predetermined signals including user-related signals and user-unrelated signals; (b) a recognition unit which recognizes the user's command, a current user-related status, and a current user-unrelated status based on the sensed signals of the command and the sensed predetermined signals; (c) a first memory which stores and updates the recognized command, the recognized user-related status, and the recognized user-unrelated status; (d) a pseudo-personality-forming unit which establishes each element of predetermined pseudo-personality elements based on the user-related status accumulated for a predetermined period of time in the first memory to form pseudo-personality, said pseudo-personality-forming unit memorizing a predetermined relationship between the predetermined pseudo-personality elements and the user-related status; (e) a second memory which stores and updates the formed pseudo-personality, wherein updating takes place under predetermined conditions; (f) a pseudo-emotion-forming unit which establishes each element of predetermined pseudo-emotion elements based on the user-related status and the user-unrelated status stored in the first memory and the pseudo-personality stored in the second memory to form pseudo-emotions, said pseudo-emotion-forming unit memorizing a predetermined relationship between the predetermined pseudo-emotion elements, the user-related and user-unrelated statuses, and the pseudo-personality; (g) an autonomous behavior-establishing unit which selects a pattern of autonomous behavior based on the user-related and user-unrelated statuses, the pseudo-personality, and the pseudo-emotions, said autonomous behavior-forming unit memorizing a predetermined relationship between patterns of autonomous behavior, the user-related and user-unrelated statuses, the pseudo-personality, and the pseudo-emotions; (h) a commanded behavior-establishing unit which constitutes a pattern of commanded behavior in accordance with the recognized user's command; (i) a behavior control unit which controls behavior by combining the selected pattern of autonomous behavior and the constituted pattern of commanded behavior based on a predetermined priority order; and (j) an output device which outputs the controlled behavior.

In the above, the external information or environment information can be omitted if the device is used under limited circumstances or if the external or environment information has nothing to do with accomplishment of the user's command or if the user so desires.

The device to be controlled in the present invention is not limited, and any device such as an engine in a motorbike or a car, an outboard engine in a vessel, an industrial robot used in machine tools, a pet robot used at home as a pet, a motor used in electrically-driven vehicles, a touring assist system equipped in a car, a conversation robot, a research assistance system, or the like can be controlled by adopting the control system of the present invention based on the same principle as the above. By modifying items included in information to be processed, the control device can be controlled in the same way. In any case, according to the present invention, the control device, to which the present invention is adapted, is likely to be equipped with quasi-intelligence.

In the present invention, another important aspect is to provide a method for adapting behavior of a device to user's characteristics, to which method the aforesaid device is adapted.

DETAILED DESCRIPTION OF THE PREFERRED EMBODIMENT

The device according to the present invention is an intelligent, adaptive, user-friendly device. The term "intelligent" means that the device is able to perceive its surroundings, reason out its task, plan a course of action, and execute those actions. The term "adaptive" means both that the device is able to respond to unexpected situations while it is carrying out its plans and also that it is able to learn from its experiences and improve its performance on the tasks that it commonly carries out. The term "user-friendly" means not only that the user is able to interact in a natural manner with the device but also that the device comes to be viewed more as a "friend" or a "pet" than a "machine". In order to accomplish these objectives, the device has a pseudo-personality and pseudo-motions, interacts with its user on an affective level, and learns about its user, in addition to autonomously and spontaneously pursuing its own goals.

Basic Architecture

Figure 1:
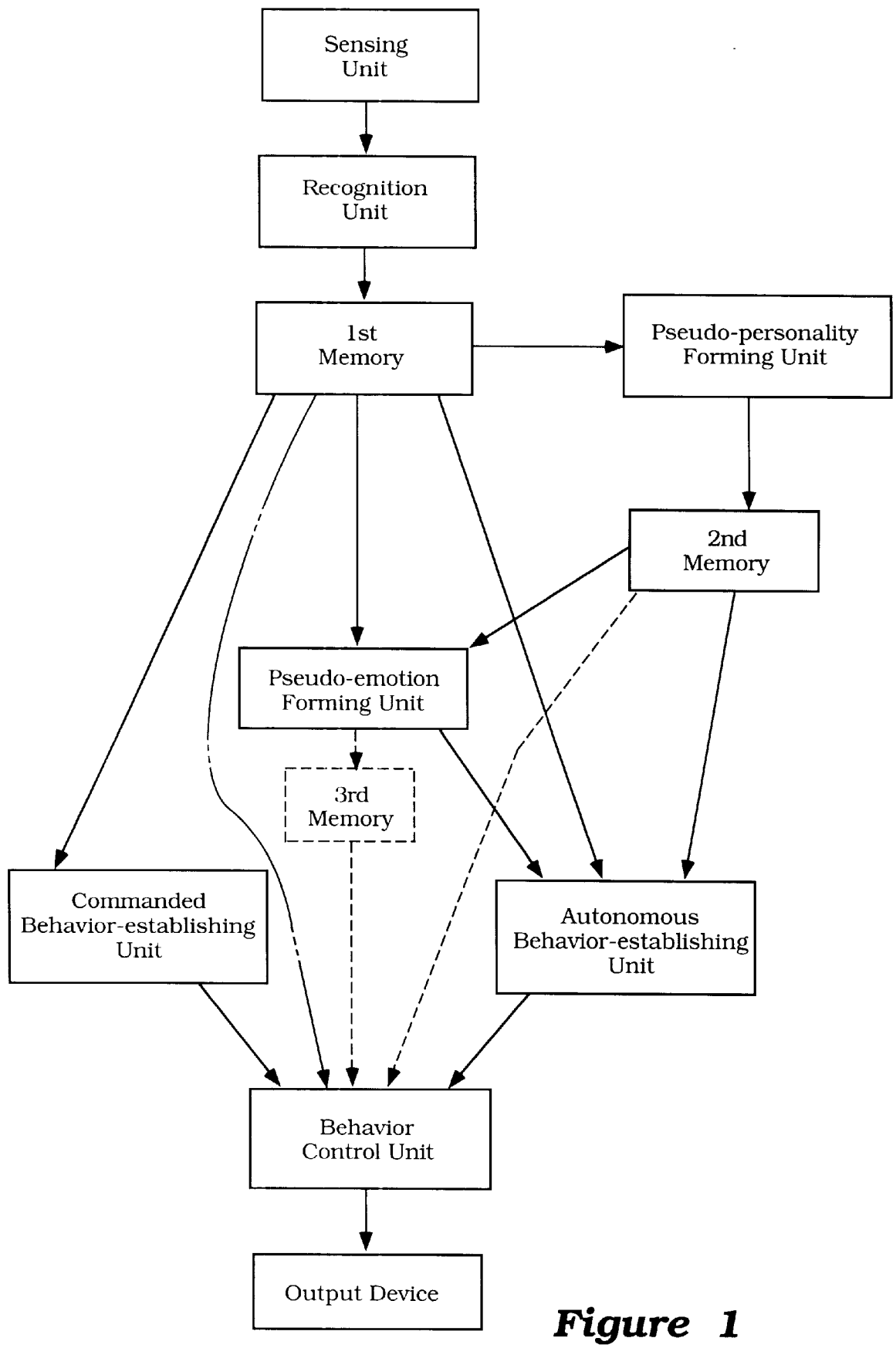
FIG. 1 is a schematic block diagram illustrating a functional architecture of the control system according to the present invention.

The control system for controlling an object using pseudo-emotions and a pseudo-personality of the present invention will be explained with reference to several embodiments depicted in the figures. FIG. 1 is a schematic block diagram illustrating a functional architecture of the control system according to the present invention.

In this figure, an autonomous device behaving adaptively to a user, comprises: a sensing unit which senses signals of user's command and predetermined user-related signals relevant to accomplishment of the command but not part of the command; a recognition unit which recognizes the user's command and a current user-related status based on the sensed signals of the command and the sensed predetermined signals; a first memory which stores and updates the recognized command and the recognized user-related status; a pseudo-personality-forming unit which establishes each element of predetermined pseudo-personality elements based on the user-related status accumulated for a predetermined period of time in the first memory to form pseudo-personality, said pseudo-personality-forming unit memorizing a predetermined relationship between the predetermined pseudo-personality elements and the user-related status; a second memory which stores and updates the formed pseudo-personality, wherein updating takes place under predetermined conditions; a pseudo-emotion-forming unit which establishes each element of predetermined pseudo-emotion elements based on the user-related status stored in the first memory and the pseudo-personality stored in the second memory to form pseudo-emotions, said pseudo-emotion-forming unit memorizing a predetermined relationship between the predetermined pseudo-emotion elements, the user-related status, and the pseudo-personality; an autonomous behavior-establishing unit which selects a pattern of autonomous behavior based on the user-related status, the pseudo-personality, and the pseudo-emotions, said autonomous behavior-forming unit memorizing a predetermined relationship between patterns of autonomous behavior, the user-related status, the pseudo-personality, and the pseudo-emotions; a commanded behavior-establishing unit which constitutes a pattern of commanded behavior in accordance with the recognized user's command; a behavior control unit which controls behavior by combining the selected pattern of autonomous behavior and the constituted pattern of commanded behavior based on a predetermined priority order; and an output device which outputs the controlled behavior.

In the above, preferably, user-unrelated information such as environmental information and external database information is included in input information in order to establish complex behavior in the object.

In the above, preferably, the device further comprises a third memory, linked to the behavior control unit, which stores and updates the pseudo-emotion formed by the pseudo-emotion-forming unit, wherein the second memory is further linked to the behavior control unit, wherein the pseudo-emotion stored in the third memory and the pseudo-personality stored in the second memory are used as parameters of the predetermined priority order provided in the behavior control unit (indicated with dotted lines in FIG. 1). Further, the first memory may be further linked to the behavior control unit, wherein the user-related status stored in the first memory, the pseudo-personality stored in the second memory, and the pseudo-emotion stored in the third memory are used as parameters of the predetermined priority order provided in the behavior control unit. In the above structures, the output behavior can be more autonomous and adaptive (indicated with a double-dotted line in FIG. 1).

FIGS. 2–10 show an embodiment wherein the present invention is adapted to a touring assist system which assists a user when the user works out a plan of touring or traveling. FIGS. 11–19 show an embodiment wherein the present invention is adapted to a pet robot which a user can keep as a pet. However, the present invention is not limited to these embodiments, and this control system can be adapted to any device which is useful to the user as an intelligent, adaptive, user-friendly device. The point is that appropriate input and output are selected, depending on the goal of the device and the user's preferences. In any case, the principle of the control system is the same as those illustrated in the figures.

Touring Assist System

This touring assist system (hereinafter referred to as "assist system") is designed to assist a user when the user lays out a plan of a travel or tour by motorbike, car, train, or on foot. The assist system itself has a pseudo-emotion which changes in response to interaction with the user or depending on the surrounding environments, and a pseudo-personality which grows based on the interaction with the user or its experience. Accordingly, the assist system assists working out the user's plan based on the interaction with the user and information on the environments (train maps, road maps, traffic news, etc., while the device expresses its pseudo-emotion or produces an autonomous response or a response in accordance with the user's command.

In practice, in order to recognize the state of the user or the environments, this assist system comprises a visual detection sensor, a touch detection sensor, an auditory detection sensor, and a means for accessing external databases, and further comprises an output device, such as a visual output device and an auditory output device, for indicating its pseudo-emotions or responses to the user. The assist system can be constructed so as to load a motorbike or a car therewith or allow the user to carry it.

Basic Structures of Touring Assist System

Figure 2:
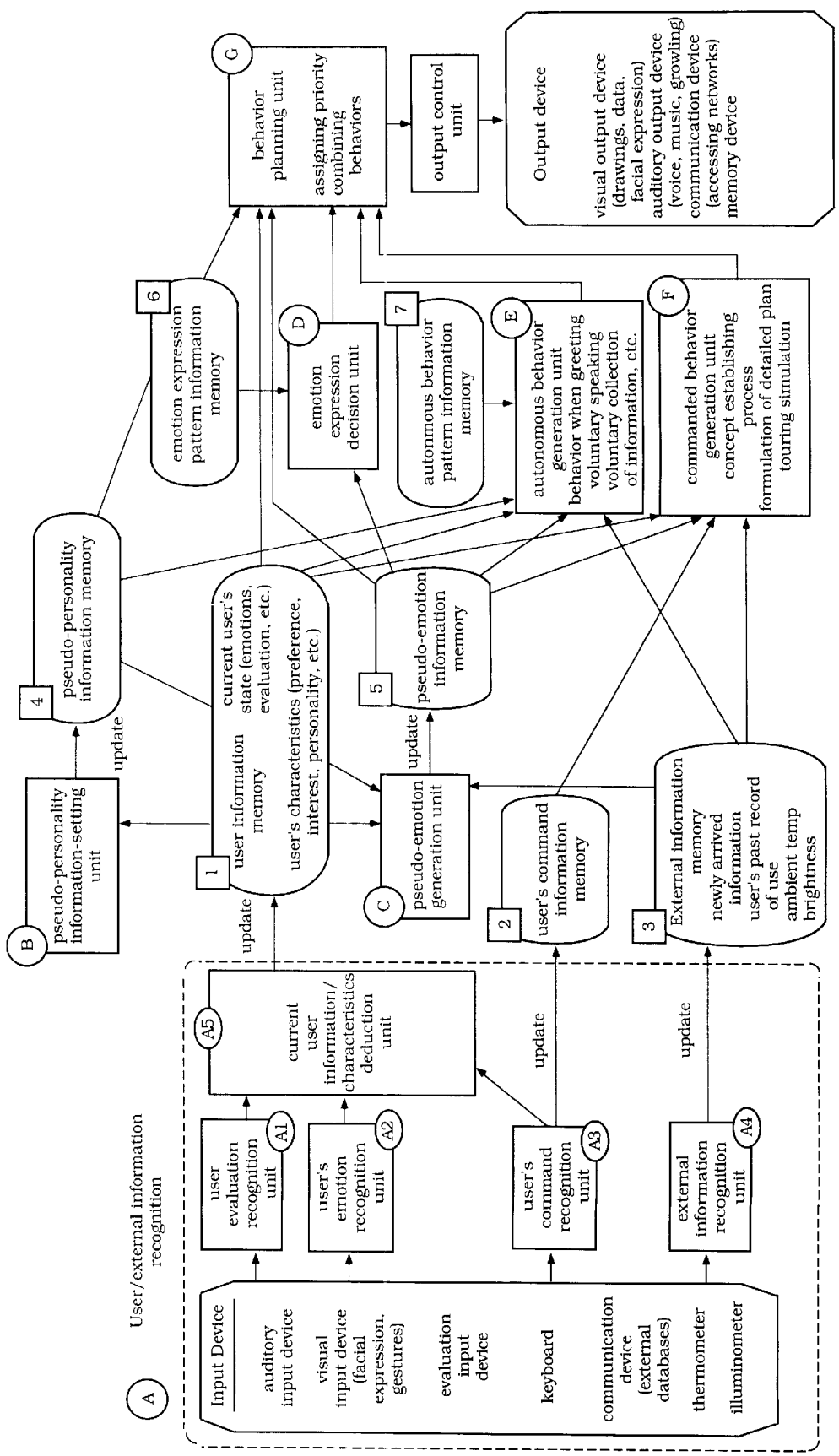
FIG. 2 is a schematic block diagram showing an example of the entire system of an assist system according to the present invention.
Figure 3:
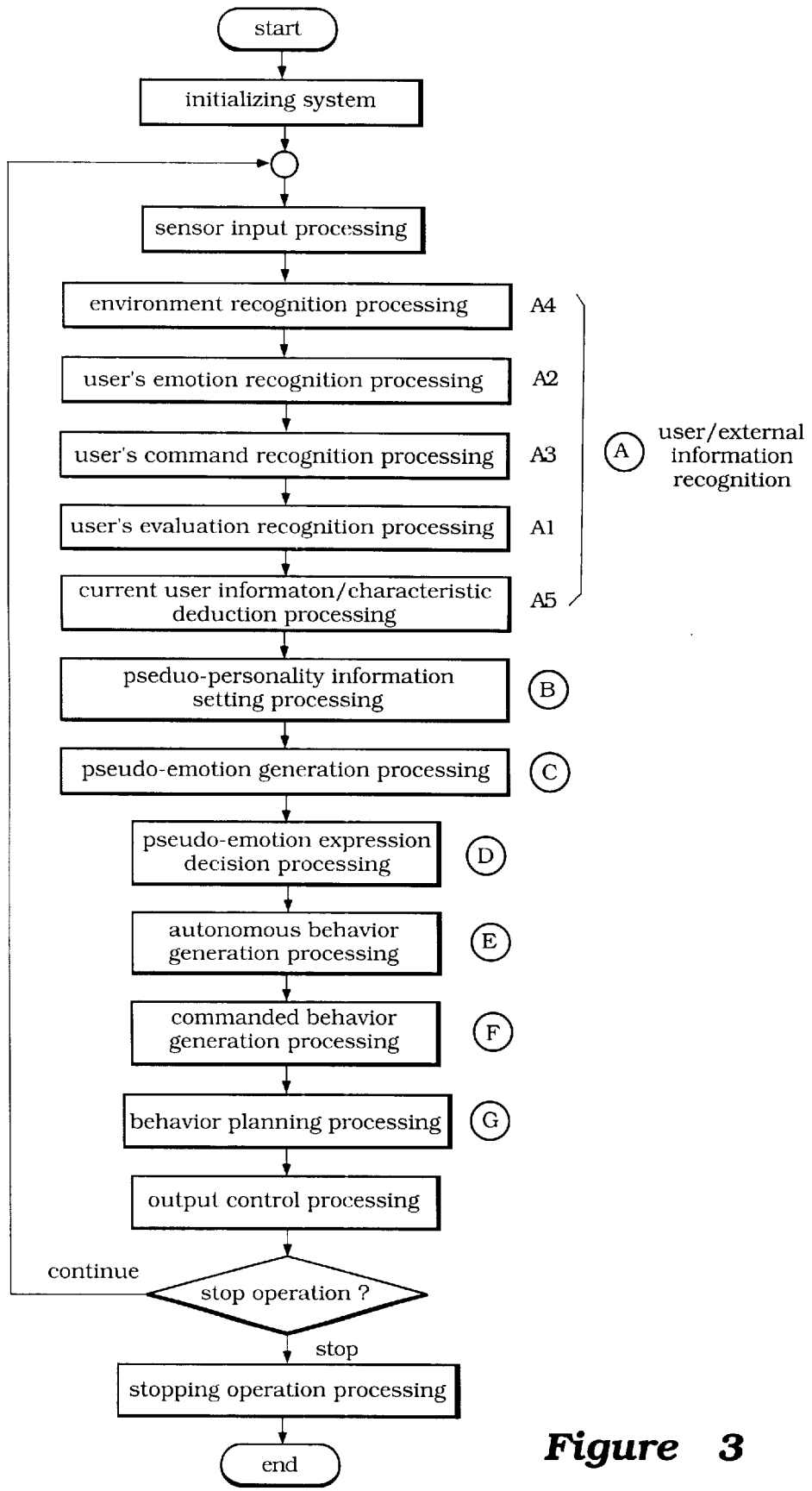
FIG. 3 is a schematic flow chart showing the entire system of the assist system according to the present invention.

FIG. 2 is a schematic block diagram showing an example of the entire system of an assist system according to the present invention. As shown in this figure, the assist system comprises: a user/external information recognition unit A for recognizing a state of the user or external information; a pseudo-personality information-setting unit B for setting a pseudo-personality by referring to the outcome of recognition by the recognition unit A; a pseudo-emotion generation unit C for generating pseudo-emotions based on the outcome of recognition by the recognition unit A and the information on the pseudo-personality set by the pseudo-personality information-setting unit B; an emotion expression decision unit D for deciding manners of emotion expression, such as expression methods to express laugh or anger on a display, based on the information on the pseudo-emotion; an autonomous behavior generation unit E for generating autonomous behavior based on the outcome of recognition, the information on the pseudo-personality, and the information on the pseudo-emotions; a commanded behavior generation unit F for generating behavior in accordance with the user's command based on the outcome of recognition and at least the preceding behavior previously outputted by this system itself; and a behavior planning unit G for deciding final behavior to be outputted using output from each of the emotion expression decision unit D, the autonomous behavior generation unit E, and the commanded behavior generated unit F, based on the outcome of recognition, the information on the pseudo-personality, and the information on the pseudo-emotions. As shown in FIG. 3, once the system is activated, this assist system repeats each processing step at units A through G until the system is turned off. The structure and function of each unit will be explained in detail below.

User/External Information Recognition Unit

As shown in FIG. 2, the user/external information recognition unit A comprises various input devices (e.g., an auditory input device, a visual input device, an evaluation input device, a keyboard, a communication device, a thermometer, an illuminometer, and/or a watch), a user's evaluation recognition unit A1, a user's emotion recognition unit A2, a user's command recognition unit A3, an external information recognition unit A4, and a current user information/characteristics deduction unit A5. The user's evaluation recognition unit A1 performs recognition-processing based on the information obtained via the input devices. The current user information/characteristics deduction unit A5 determines or deduces a current state of the user and the user's characteristics such as the user's preferences based on the recognition outcome from the user-related recognition units A1 through A3.

In the above, the input device includes a microphone as an auditory input device, a camera as a visual input device, a switch or lever for inputting the user's evaluation as an evaluation input device, and an antenna, a modem, a terminal adapter, or merely an input port as a communication device. However, the input devices are not limited to the above. Any input device can be used which is available on the market, which is capable of detecting external information visually, auditorily, and/or tactilely, and which is capable of accessing external databases.

The term "external information" means not only information on the surrounding environments, such as the temperature, brightness, or time, where the system is operated (hereinafter referred to as "environmental information"), but also information obtained from external databases other than from the user or the system.

Figure 4:
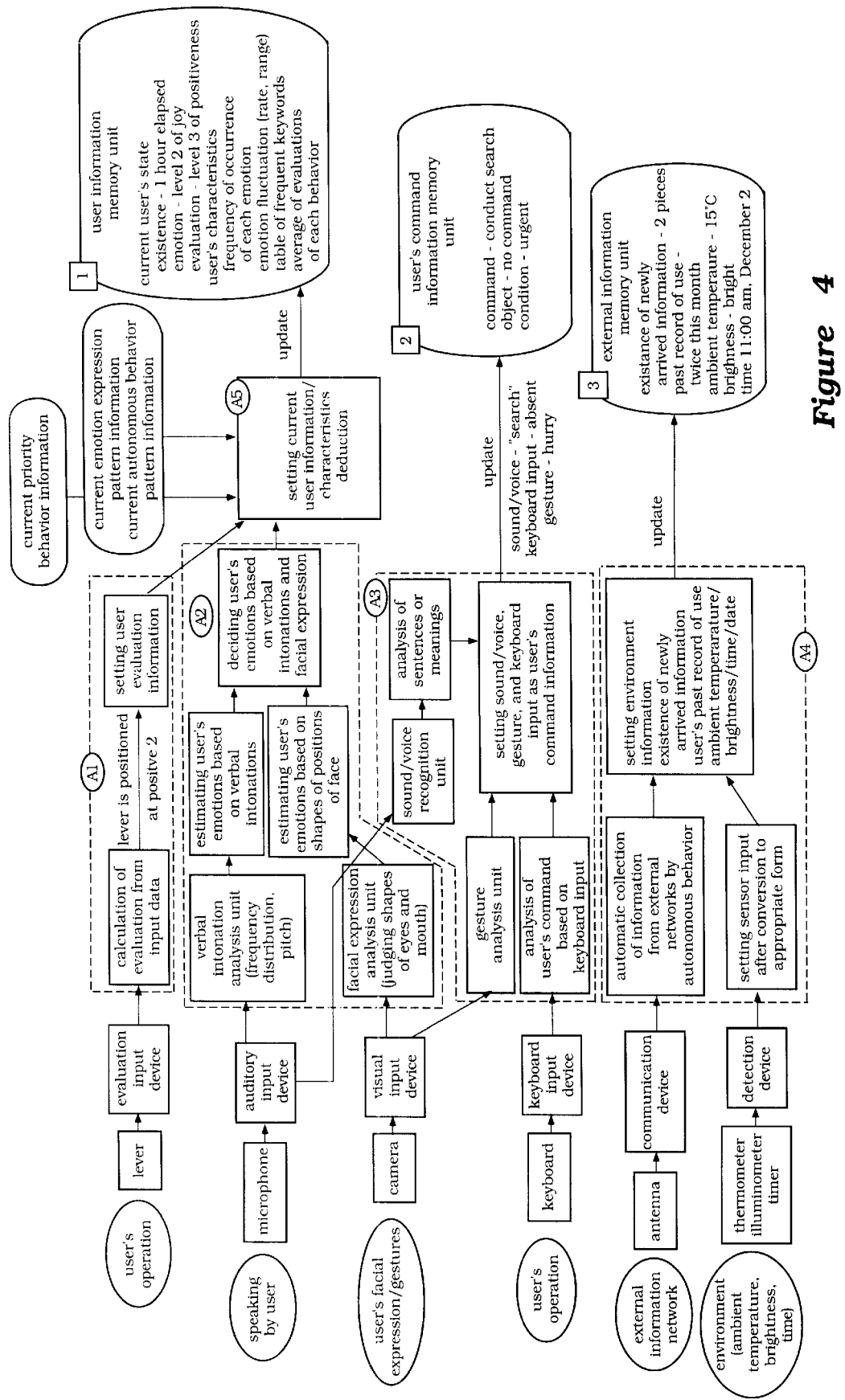
FIG. 4 is a schematic block diagram showing the user/external information recognition unit A indicated in FIG. 1.

FIG. 4 is a schematic block diagram showing the user/external information recognition unit A in detail to explain processes at each of the processing units A1 through A5 in the user/external information recognition unit A.

As shown in this figure, the user's evaluation recognition unit A1 establishes the user's evaluation as to behavior outputted by the system and sets the result, for example, as information on the user's evaluation, by calculating an evaluation value from data inputted by an evaluation input device composed of a lever, for example, which allows the user to input his/her evaluation at an appropriate level among plural levels, depending on the user's satisfaction.

The user's emotion recognition unit A2 presumes the user's current emotions based on the characteristics found in the auditory information and the user's facial expression, wherein an auditory analysis (analysis of frequency distributions or pitches of the sound/voice) and a facial expression analysis (analysis based on the shapes of the eyes and the mouth) are conducted based on the auditory information and the user's facial expression inputted from the auditory input device and the visual input device. Further, based on the presumed emotions, the user's emotion recognition unit A2 determines the user's current emotion. In the above, the several patterns of emotions are obtained by categorizing in advance the emotion expressions of the user into several patterns of emotions such as joyful, sad, surprised, angry, disgusted, and fearful. The patterns of emotion expressions are recognized by subdividing each pattern into several levels. In the above, the presumption of the user's emotions based on the input information can be performed using a fuzzy logic with predetermined rules, or using data obtained by formulating or mapping in advance the relationship between emotions and characteristics of sounds/voices and facial expressions, or using appropriate functional equations if regularity can be found in the relationship between emotions and characteristics of sounds/voices and facial expressions. The information inputted into the emotion recognition unit A2 is not limited to the above and includes any information related to the user's behavior affected by or representing the user's emotions, for example, the manner of punching the keyboard: If the user punches the same key several times without a special reason when the user inputs information, the user is presumed to be irritated (a low level of anger).

The user's command recognition unit A3 recognizes and establishes the user's command information based on indirect command information obtained by analyzing the meaning of the sound/voice recognized by the auditory input device and by analyzing information on the user's gestures recognized by the visual input device, and based on direct command information inputted via the keyboard. The command information includes not only direct commands such as "search" or "lay out an action plan" but also a degree of requirement for the command such as "urgent" and "normal". The degree of requirement can be recognized by, for example, the loudness of the user's voice or the speed of the user's speech inputted via the auditory input device, or the user's gesture inputted via the visual input device. The recognition means is not limited to the above and includes various input information such as the strength of punching the keyboard wherein each key is provided with a pressure-sensing sensor. The information obtained from the keyboard provided with pressure-sensing sensors can be used in the recognition process at the user's emotion recognition unit A2.

The external information recognition unit A4 establishes external information such as newly released information from external databases, the user's past record of using the system, ambient temperature, brightness, time, and date, by automatically collecting information through external information networks such as the Internet via the communication device and by processing the inputted information from various sensors such as a thermometer, illuminometer, and watch.

The current user information/characteristics deduction unit A5 determines or deducing the current state and the characteristics of the user based on the recognition results at the user-related information recognition units A1 through A3, the information on the current priority behavior described later, the information on the emotion expression patterns, and the information on the autonomous behavior patterns. The current user information/characteristics deduction unit A5 then updates data of the recognition information related to the user stored in a user information memory 1.

In the above, the current state of the user includes a time period while the user is located within a range where the system can locate the user; the level of the user's emotions; and the user's evaluation as to the behavior outputted by the system. The characteristics of the user includes frequency of the occurrence of each emotion, the changing rate or range of emotions, the types of keywords that the user uses, frequency of use of keywords, and the average value of the user's evaluation as to the behavior outputted by the system.

The output of the user's command recognition unit A3 is transmitted not only to the user information memory 1 but also to a user's command information memory 2, thereby updating the information related to the user's command stored in the memory 2. The information related to the user's command includes, for example, the contents of the command, the object of the command, and the conditions of the command.

The output of the external information recognition unit A4 is transmitted to an external information memory 3, thereby updating the information stored in the memory 3.

Pseudo-Personality Information-Setting Unit

Figure 5:
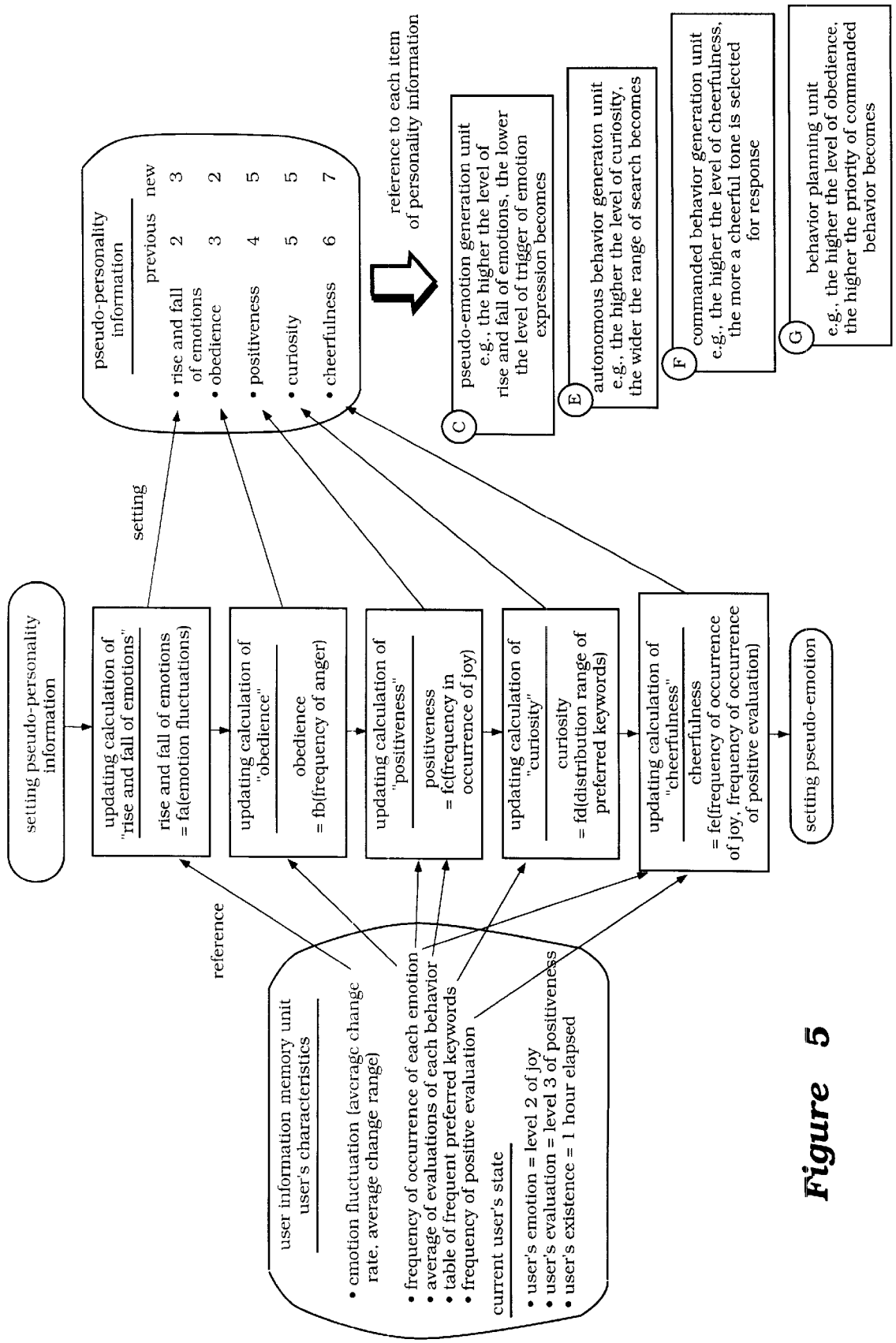
FIG. 5 is a schematic flow chart showing processes at the pseudo-personality information-setting unit B indicated in FIG. 1.

FIG. 5 is a schematic flow chart showing processes at the pseudo-personality information-setting unit B.

The pseudo-personality information-setting unit B is constructed so as to set, as a pseudo-personality, a group of several preliminary personalities, each subdividable into several levels. Based on the information stored in the user information memory 2, the level of each preliminary personality is set, and the higher the level, the more the preliminary personality contributes to the formation of the pseudo-emotions and the action plan. The preliminary personalities include, for example, "rise and fall of emotions", "obedience", "aggressiveness", "curiosity", and "cheerfulness". Each preliminary personality is correlated with each characteristic of the user stored in the user information memory 1. In the above, "rise and fall of emotions" is correlated with the changing rate or range of the user's emotions, "obedience" is correlated with frequency of the occurrence of the user's emotion "anger", "aggressiveness" is correlated with the evaluation of the behavior outputted by the system and frequency of the occurrence of each emotion in the user at the time of evaluation, "curiosity" is correlated with the range of keywords that the user likes to use, and "cheerfulness" is correlated with frequency of the occurrence of the user's emotion "joy" and positive evaluation of the behavior outputted by the system. Thus, in the above, if the emotions of the user intensively and often fluctuate, the level of rise and fall of emotions is increased. If the user gets angry often, the level of obedience is decreased. If the user positively evaluates the behavior outputted by the system and is delighted, the level of aggressiveness is increased. If the keyword that the user likes are scattered in various fields, the level of curiosity is increased. If the user often positively evaluates the behavior outputted by the system and is often delighted, the level of cheerfulness is increased.

The pseudo-personality established at the pseudo-personality setting unit B is outputted to a pseudo-personality information memory 4 per preliminary personality, thereby updating the information stored in the pseudo-personality information memory 4. Updating can be conducted by using the input from the pseudo-personality setting unit B as new pseudo-personality information and overriding the preceding information, or by adding the levels of the preliminary personalities obtained at the pseudo-personality setting unit B to the preceding information. The former method allows the pseudo-personality of the system to be highly responsive to the user's characteristics, and the latter method allows the pseudo-personality of the system to grow in accordance with frequency of use of the system and a lapse of time, thereby allowing the user to enjoy the growth of the pseudo-personality of the system. In particular, in the case of the latter method, if the levels of each preliminary personality are set at several detailed levels, and output from the pseudo-personality information-setting unit B is set to be low, it is possible to enjoy the growth of the pseudo-personality of the system which takes place over a long period of time, i.e., the personality can be more human-like.

Pseudo-Emotion Generation Unit

Figure 6:
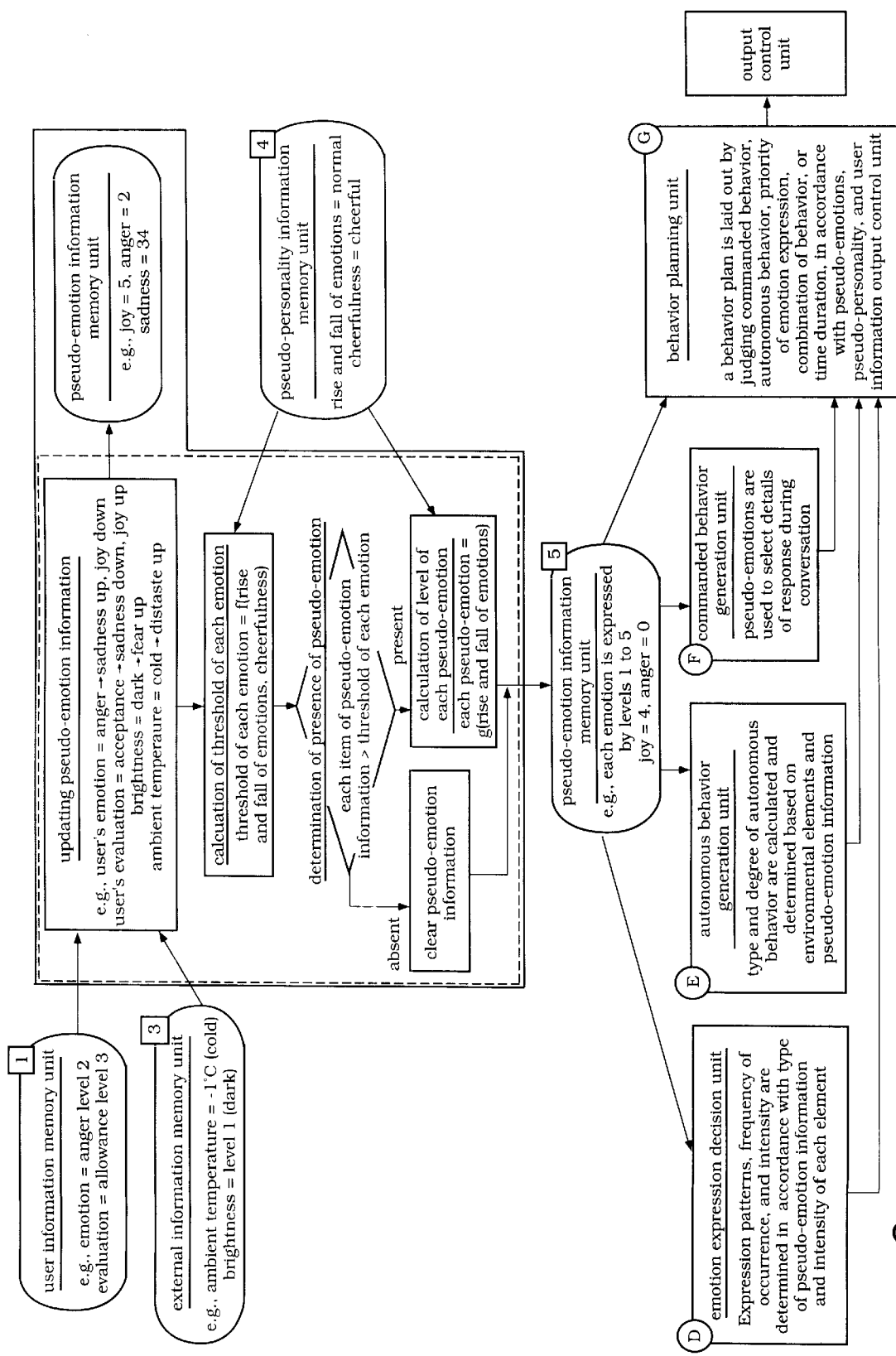
FIG. 6 is a schematic flow chart showing processes at the pseudo-emotion generation unit C indicated in FIG. 1.

FIG. 6 is a schematic flow chart showing processes at the pseudo-emotion generation unit C.

The pseudo-emotion generation unit C receives output from the user information memory 1, the external information memory 3, and the pseudo-personality information memory 4, and, based on the above information, the pseudo-emotion generation unit C generates pseudo-emotion information of the system.

The pseudo-emotion generation unit C memorizes several predetermined preliminary emotions (such as "joyful", "sad", "surprised", "angry", "disgusted", and "fearful"), and sets the level of each preliminary emotion based on the information inputted from the user information memory 1 and the external information memory 3. In practice, the level of each preliminary emotion can be determined by rules or functional equations correlating the level of each preliminary emotion with the information on the state of the user (such as emotion level and evaluation level) stored in the user information memory 1 and the information on the environmental information stored in the external information memory 3. The relationship between the preliminary emotions, the state of the user, and the environmental information is formulated, for example, as follows: The higher the level of "anger" among the user's emotions, the higher the level of "sadness" becomes and the lower the level of "joy" becomes among the user's preliminary emotions. The higher the level of evaluation as to the behavior outputted by the system, the higher the level of "joy" becomes and the lower the level of "sadness" becomes. The lower the ambient temperature obtained from the environmental information, the higher the level of "disgust" becomes. The darker the surrounding environment, the higher the level of "fear" becomes.

The pseudo-emotion generation unit C decides whether or not each preliminary emotion generated at the unit C is outputted therefrom as pseudo-emotions based on a predetermined threshold set for each preliminary emotion (hereinafter referred to as "preliminary emotion threshold"). The level of a preliminary emotion which is not outputted is set at zero, and the level of a preliminary emotion which is outputted is set at an appropriate level based on the information on the pseudo-personality. A group of the above preliminary emotions are outputted as a pseudo-emotion.

The preliminary emotion threshold is correlated in advance to the pseudo-personality information, and is decided based on the pseudo-personality information inputted from the pseudo-personality information memory 4. In practice, each preliminary emotion threshold is correlated in such a way as to change in accordance with the level of each preliminary emotion in the pseudo-personality information. For example, the higher the level of "rise and fall of emotions" in the pseudo-personality, the lower the threshold of each preliminary emotion becomes. In contrast, the lower the level, the higher the threshold of each preliminary emotion becomes. The higher the level of "cheerfulness" in the pseudo-personality, the lower the threshold of only "joy" among the others and the higher the thresholds of the remaining preliminary emotions become. In the former, the higher the level of "rise and fall of emotions" in the pseudo-personality, the higher the possibility of exceeding the respective thresholds becomes, thereby increasing the possibility of expressing the preliminary emotions as the pseudo-emotion, i.e., emotion fluctuation becomes remarkable. In the latter, the higher the level of "cheerfulness" in the pseudo-personality, the higher the possibility of exceeding the threshold of only "joy" becomes, thereby rendering the system joyful. In another example, the higher the level of "obedience" in the pseudo-personality, the higher the threshold of each preliminary emotion becomes. In contrast, the lower the level of "obedience", the lower the threshold of each preliminary emotion becomes. As described above, by correlating the preliminary emotion thresholds with the levels of each preliminary emotion in the pseudo-personality, the likelihood of appearance of each pseudo-emotion is changed depending on the pseudo-personality, and as the pseudo-personality grows, the manner of appearance of pseudo-emotions grows.

After calculating the threshold of each preliminary emotion for each preliminary emotion, or during such calculation, each preliminary emotion threshold and the corresponding preliminary emotion are compared, and only preliminary emotions whose levels are higher than the respective preliminary emotion thresholds undergo calculation of their levels to output as a pseudo-emotion. The remaining preliminary emotions are cleared except for the set information.

The levels to be outputted as pseudo-emotions are correlated with the levels of the preliminary personalities in the pseudo-personality, and can be calculated using rules or functional equations. In practice, for example, the higher the level of "rise and fall of emotions" in the pseudo-personality, the closer to the levels of preliminary emotions the output levels of pseudo-emotions become. In contrast, the lower the level of "rise and fall of emotions" in the pseudo-personality, the lower then the levels of preliminary emotions the output levels of pseudo-emotions become.

The pseudo-emotions obtained by the above processes are outputted to a pseudo-emotion information memory 5, thereby updating the data stored in the memory 5.

Emotion Expression Decision Unit

Figure 7:
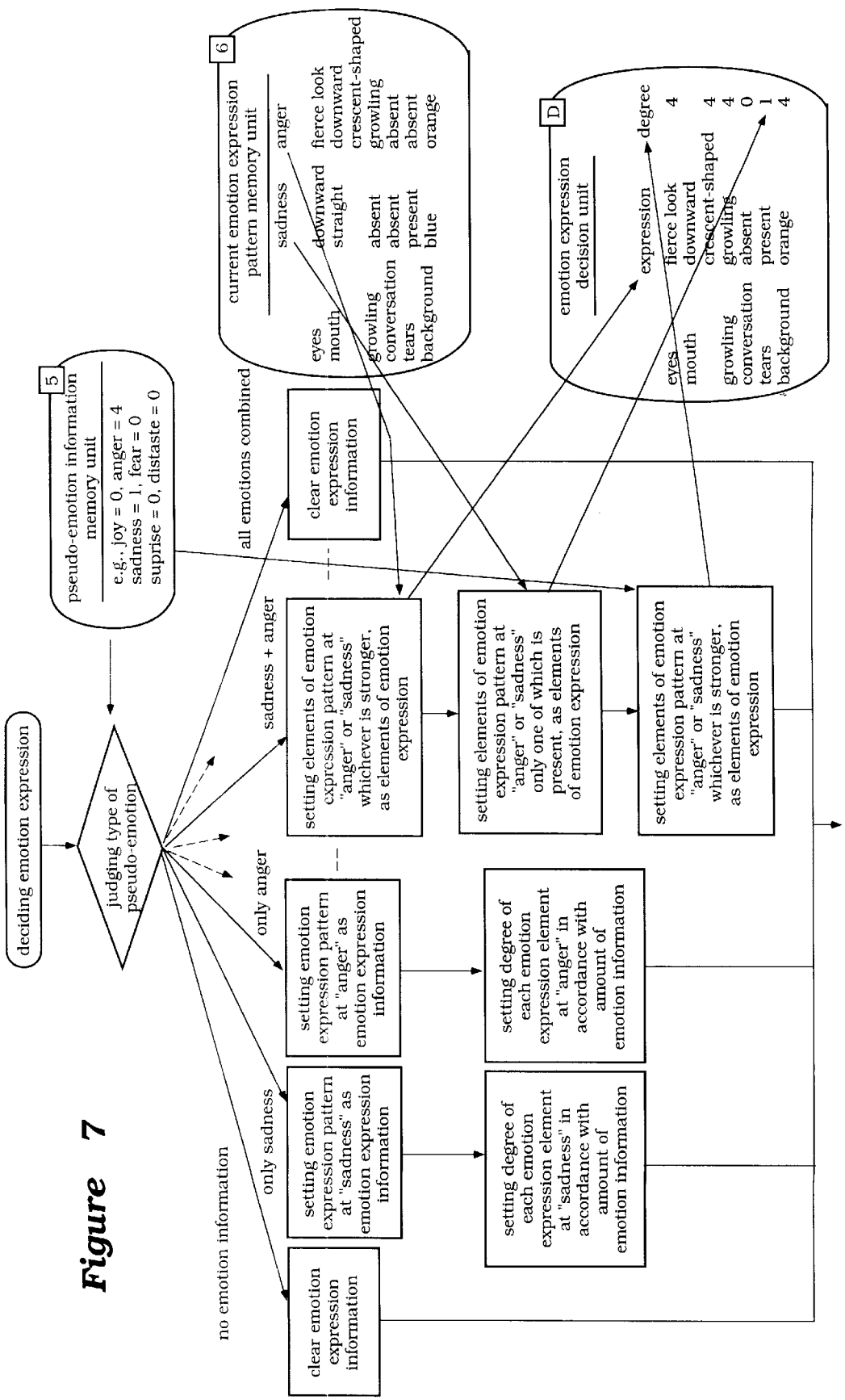
FIG. 7 is a schematic flow chart showing processes at the emotion expression decision unit D indicated in FIG. 1.

FIG. 7 is a schematic flow chart showing processes at the emotion expression decision unit D.

The emotion expression decision unit D judges the level of each preliminary emotion from the pseudo-emotion information obtained from the pseudo-emotion memory 5, and determines emotion expression to be outputted based on preliminary emotions whose levels are high or more than zero.

The emotion expression is selected from plural patterns of emotion expression in relation to pseudo-emotions stored in advance in an emotion expression pattern memory 6. The emotion expression includes, in practice, changes in shapes of the eyes and the mouth or the shedding of tears if a "face" is created by a visual output device. Further, emotion expression can be indicated by background color of the "face" on the display, or by sounds or voices or conversation using an auditory output device. In the above, the emotion expression pattern memory 6 memorizes in advance patterns of each of eyes, mouth, tears, background color, sound, and conversation in relation to each level of each preliminary emotion.

The method of selecting the patterns of the emotion expressions at the emotion expression unit D can be simply a method wherein the pattern of the emotion expression, which corresponds to the preliminary emotion having the highest level, is selected. However, preferably, a pattern of the absence of expression (expressionless) is created among patterns of emotion expressions, and if the levels of all of the preliminary emotions are zero, the expressionless pattern is selected, and if the levels of preliminary emotions, except for one preliminary emotion, are zero, a pattern corresponding to the one preliminary emotion is selected. If the levels of more than one but not all preliminary emotions are more than zero, a pattern of a preliminary emotion having a higher level than those of the other preliminary emotions has priority over the other patterns. Further, among the remaining patterns, a pattern of a preliminary emotion having a lower level than the first one is selected where the first pattern does not apply. In the above, the first pattern and the second pattern are combined to make one combined expression. If the levels of all of the preliminary emotions are more than zero, the expressionless pattern may be selected. Accordingly, the pseudo-emotions can be indicated in a complex manner.

The emotion expression decision unit D determines emotion expression patterns from the pseudo-emotions at the moment in the above-described manner, set the patterns as emotion expression behavior, and outputs them to the behavior planning unit G.

Autonomous Behavior Generation Unit

Figure 8:
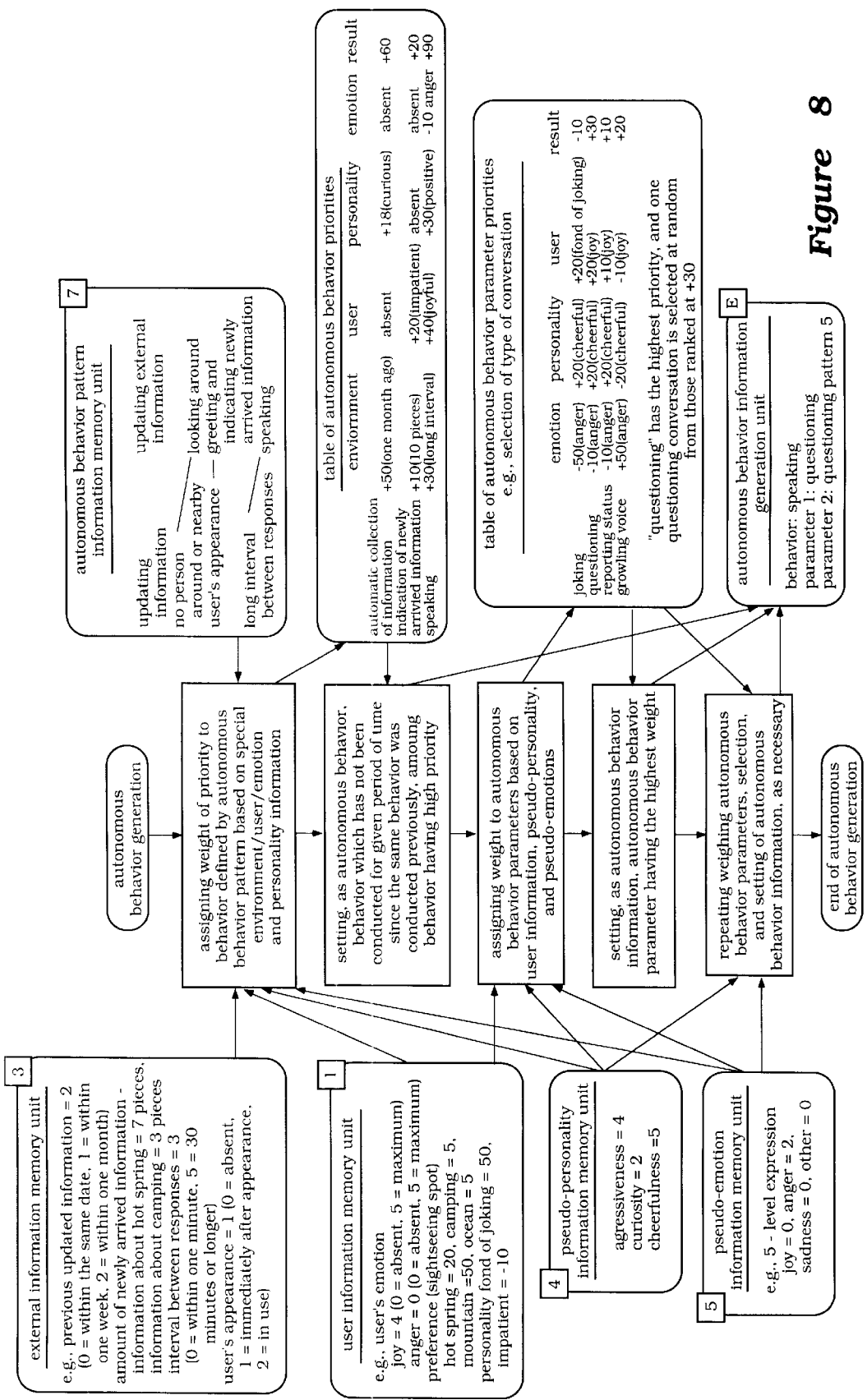
FIG. 8 is a schematic flow chart showing processes at the autonomous behavior generation unit E indicated in FIG. 1.

FIG. 8 is a schematic flow chart showing processes at the autonomous behavior generation unit E.

The autonomous behavior generation unit E weighs plural autonomous behaviors set in an autonomous behavior pattern memory 7 based on specific external information, the user information, the pseudo-emotion information, and the pseudo-personality information, in order to determine a degree of priority of each autonomous behavior.

In this embodiment, the autonomous behavior patterns are composed of upper behavior patterns and lower behavior patterns. First, the upper behavior patterns are weighed, and after selecting an upper behavior pattern having a higher degree of importance, the lower behavior patterns are weighed for the selected upper behavior pattern, thereby selecting a lower behavior pattern having a higher degree of importance.

The upper behavior patterns include, for example, "indication of newly released information", "speaking to the user", and "automatic collection of information".

Each of the plural behavior patterns is correlated with the levels of each of the external information, the user information, the pseudo-emotion information, and the pseudo-personality, and the degree of importance of each behavior is determined based on the level of each item of information. In practice, for example, with regard to the external information and the user information, the status of updating newly released information, its amount, the user's emotions, preferences, and personality, intervals of response by the user, and a time period while the user is located within a range where the system can locate the user are converted to numerical values which are then correlated with each degree of importance. With regard to the pseudo-emotion information and the pseudo-personality information, the level of each preliminary emotion and the level of each preliminary personality are correlated with the degree of importance of each behavior pattern. Correlation of each item of information with each degree of importance can be achieved using functional equations if there is regularity between them. If there is no regularity between them, data indicating their relationship can be obtained through experiments in advance.

The autonomous behavior generation unit E assigns a degree of importance to each behavior pattern as described above, and then sets a behavior which has the highest degree of importance and which has not been selected for a given period of time since the same behavior was previously conducted, as autonomous behavior information. In the above, the set behavior pattern is an upper behavior pattern, and the autonomous behavior generation unit E assigns degrees of importance to plural lower behavior patterns for the set upper behavior pattern. The lower behavior patterns include, for example, "joking", "questioning", "reporting the current status", and "growling", which correspond to "speaking to the user" of the upper behavior pattern.

The autonomous behavior generation unit E assigns degrees of importance to the lower behavior patterns, and then sets a behavior which has the highest degree of importance as autonomous behavior information. In an embodiment indicated in FIG. 8, the upper behavior pattern "speaking to the user" is selected, and further "questioning" is selected, i.e., the behavior "questioning" is selected. From data regarding the lower behavior patterns, one particular question is then selected, and this behavior is set as a final autonomous behavior. In the above, when one data is selected from a group of data ranking lower (lower level or more detailed level) than the lower behavior patterns, the selection can be made at random or can be made in accordance with appropriate rules, e.g., if the command from the user can be understood from the user information, words in the text of the command can be used as keywords for a keyword search, and a question in correspondence most with the searched keyword can be selected.

In this embodiment, assigning degrees of importance to behavior patterns are conducted in two levels, i.e., in both the upper behavior patterns and the lower behavior patterns, and final autonomous behavior information is selected from a group of low-level data. The selection process is not limited to the above, and can be conducted in three or more levels when behavior patterns are categorized into three or more levels. If the levels of autonomous behavior patterns, to which degrees of importance are assigned, are categorized in detail, the range of autonomous behavior can be broadened.

Further, in this embodiment, automatic collection of information is one of many autonomous behavior patterns. However, automatic collection of information can be independent from the other autonomous behavior patterns, and can be conducted constantly. In this case, intervals of collecting information and a range of information only may be changed in accordance with the pseudo-personality information, the pseudo-emotion information, and the user information. That is, the above information and the levels of the automatic collection of information may be correlated with each other in advance. For example, the higher the level of "aggressiveness" in the pseudo-personality, or the higher the level of "joy" in the pseudo-emotions, or the higher the level of "impatient character" in the user information, the higher the level of the automatic collection of information becomes, i.e., accordingly, intervals of collection becomes shorter and the range of information become wider. In this way, while the user is interacting with the system, the system can collect new information by its own judgement, and the thus-obtained data provide higher satisfaction to the user by generation of more complete autonomous behavior and commanded behavior described below.

Commanded Behavior Generation Unit

The commanded behavior generation unit F generates commanded behavior by using information from the external information memory 3 in accordance with the user's command included in the user's command information. In practice, in this assist system, the commanded behavior includes answering the user's questions, outlining an action plan required by the user, constituting a detailed action plan, and formation of simulation of the action plan. More specifically, answering the user's questions means conducting a search using the external information memory 3 and/or the external databases and displaying the search result, if the user commands the system to conduct a search. Outlining an action plan and constructing a detailed plan mean laying out a travel plan showing the user's destination and tourist attractions on the way to the destination, laying out a route if the user is touring by car or motorbike, and laying out a train route if the user is traveling by train.

In the above, commanded behavior generation processes at the commanded behavior generation unit F are conducted by at least referring to the previous behavior outputted from the system, and the information about the user's evaluation as to the previous behavior. For example, when the user commands the system to conduct a search, if the previously outputted behavior included a result of a search, the commanded behavior generation unit F determines whether the keyword used in the previous search was in accordance with the user's request based on the level of the user's evaluation as to the result of the previous search. If the level of the user's evaluation was high, the unit F judges that the user is satisfied with the keyword used in the search, and the unit F conducts a second search with the same keyword. If the level of the user's evaluation was low, the unit F judges that the user is not satisfied with the keyword, the unit F conducts a new first search with a new keyword.

As described above, upon referring to the user's evaluation and the previously outputted behavior, the next commanded behavior is generated, so that behavior more suitable to the user can be generated.

Further, the commanded behavior generation unit F can generate absolute behavior in addition to the above-mentioned commanded behavior. In practice, for example, risk-related keyword, such as "earthquake", "frequently happening", and "heavy rain and flood warning", or generally undesirable keywords are memorized as risk information keywords, and if such risk information keywords are found in a piece of information automatically collected during autonomous behavior, the piece of information can be designed to be displayed as absolute behavior. As described above, by autonomously detecting risk information and setting the information as absolute behavior, the risk information can be given priority over other information and be displayed in addition to an action plan, when the user's action is travelling.

Behavior Planning Unit

The behavior planning unit G receives behavior information from each of the emotion expression decision unit D, the autonomous behavior generation unit E, and the commanded behavior generation unit F; sets degrees of priority at each item of behavior information based on the pseudo-personality information, the pseudo-emotion information, and the user information; generates new priority behavior information; combines each item of behavior information based on the new priority behavior information having priority; and decides final output behavior.

Figure 9:
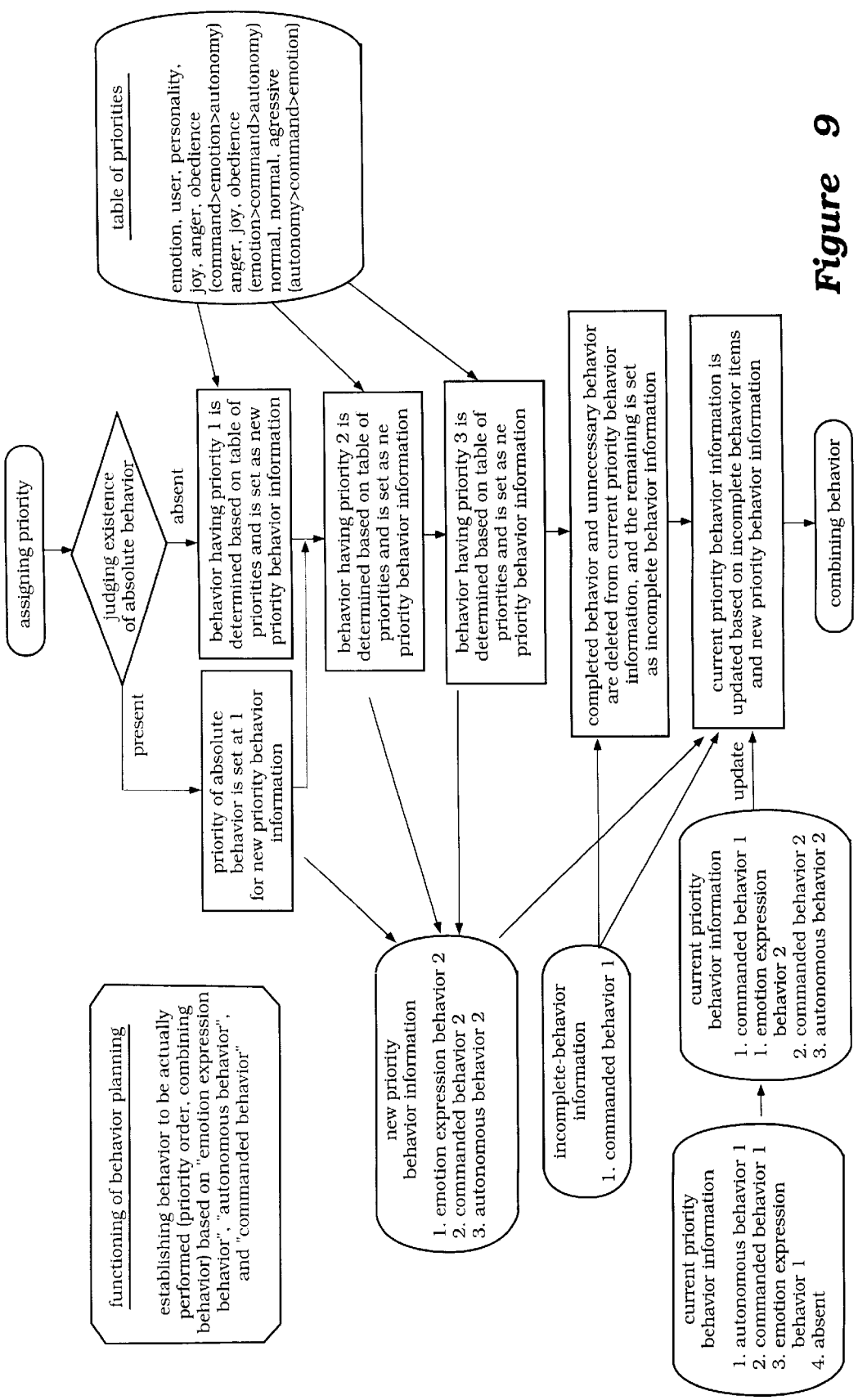
FIG. 9 is a schematic flow chart showing processes at the behavior planning unit G indicated in FIG. 1.
Figure 10:
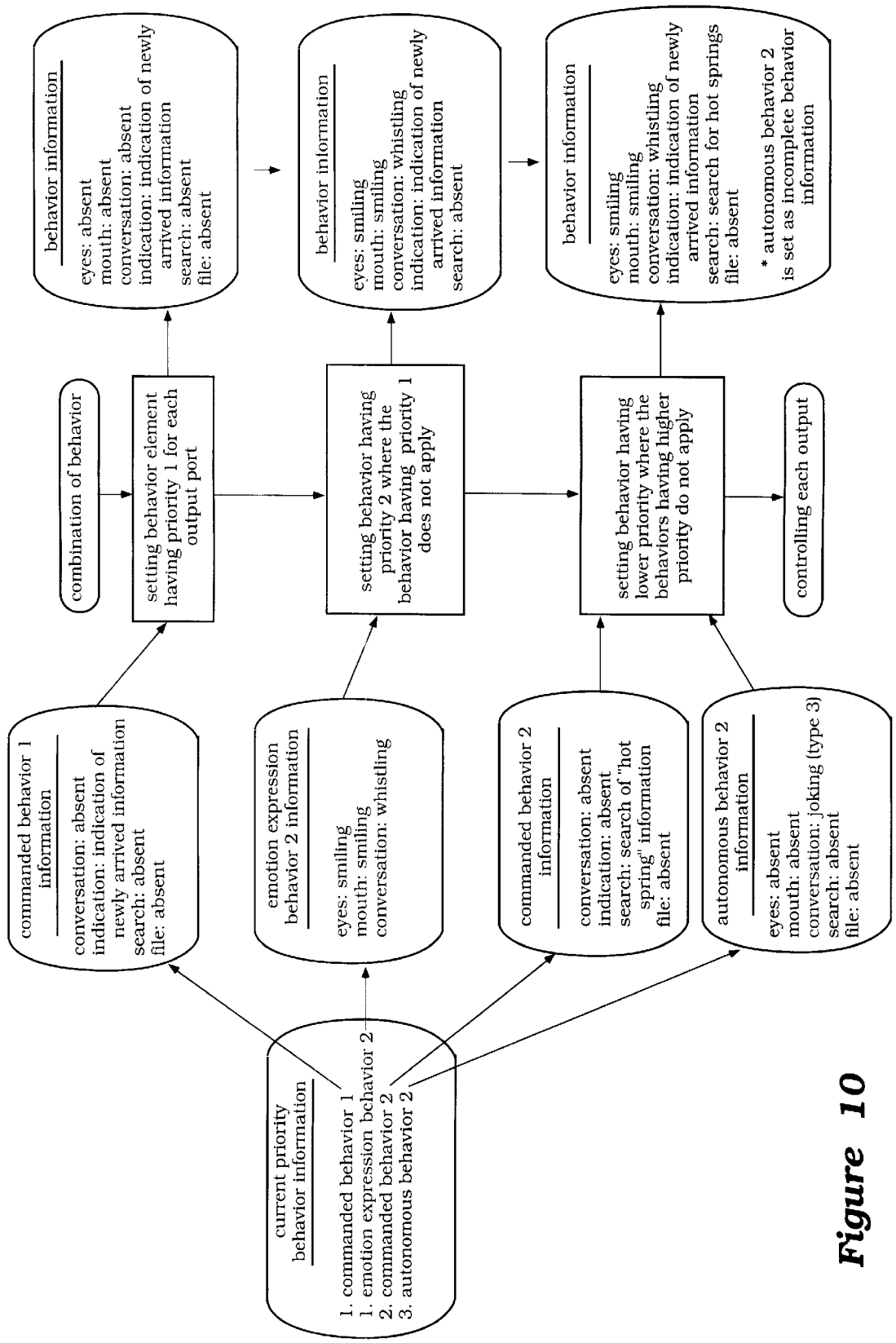
FIG. 10 is a schematic flow chart showing processes from generation of each item of behavior information based on the current behavior information to setting of final output behavior.

FIGS. 9 and 10 are schematic flow charts showing processes at the behavior planning unit G.

The behavior planning unit G first judges whether or not there is required absolute behavior. At this time, if there is required absolute behavior, the absolute behavior information is set at priority 1. The absolute behavior information includes information on absolute behavior generated at the commanded behavior generation unit, as described above, and information on behavior requiring urgent action against a situation such as input device failure.

As the result of judgement as to whether there is required absolute behavior, if there is no required absolute behavior, a degree of priority (1 to 3: in this case, priority is 1, i.e., high priority) is determined for each item of behavior information based on a table of degrees of priority, and is set as new priority behavior information.

The table of degrees of priority is a table defining degrees of priority as described in FIG. 9, for example: If the pseudo-emotion is "joy", the pseudo-personality is "obedience", and the state of the user is "anger", the commanded behavior is set at priority 1, the emotion expression behavior is set at priority 2, and the autonomous behavior is set at priority 3. As above, the table is a group of data wherein a degree of priority of each item of behavior information is set for a combination of all pseudo-emotions, all pseudo-personalities, and all user's states. However, the method of determining the degree of priority is not limited to the above, and includes, for example, fuzzy logic technique using fuzzy rules which define in advance the relationship between the pseudo-emotions, the pseudo-personalities, the user's states, and the degrees of priority of behavior information, wherein membership equations of behavior information are formulated with respect to the degrees of priority.

After setting the new priority behavior information, the behavior which has already been performed and the behavior which need not be performed are deleted, and the remaining behavior patterns are set as incomplete behavior information. This incomplete behavior information is set to be more important than the aforesaid new priority behavior information. Based on the incomplete behavior information and the new priority behavior information, the current priority behavior information is updated. Each item of behavior information is combined based on the current priority behavior information.

FIG. 10 is a schematic flow chart showing processes from generation of each item of behavior information based on the current behavior information to setting of final output behavior.

Composite behavior is created by setting a behavior having a higher degree of priority first. That is, each item of behavior information is composed of plural behaviors, and in practice, the behavior information of this embodiment includes any of the following: eyes, mouth, conversation, display, search, and file. In order of priority, behaviors in the behavior information are set, and a behavior in the behavior information having lower priority is set only when there is no conflict with the behaviors already defined by the higher priority behavior information, i.e., the behaviors which the high priority behavior information does not define can be filled with those in the lower priority behavior information.

In the embodiment indicated in FIG. 10, the behavior (display: newly released information) defined by the commanded behavior which has the highest priority is set first. Second, the behavior defined by the emotion expression behavior having priority 2 (eyes: smiling eyes; mouth: smiling mouth; conversation: whistling) is set. Third, the behavior defined by the commanded behavior having priority 3 (search: hot spring) is set. Fourth (last), the behavior defined by the autonomous behavior having priority 4 is set. As can be seen in the above example, although the autonomous behavior having priority 4 defines "conversation: chatting (type 3)", the behavior has been defined by the emotion expression behavior having priority 2 (conversation: whistling), i.e., "conversation" has already been defined. Thus, the behavior "conversation" defined by the autonomous behavior is not adopted. In the above, the reason that there are two commanded behaviors with regard to "conversation" in the above example is that "commanded behavior information" in the previous incomplete behavior was maintained, i.e., the previous incomplete behavior information is assigned priority.

Effects

As described above, according to this assist system, the assist system itself is equipped with a pseudo-personality, which grows by interacting with the state of the user, and pseudo-emotions, which change in accordance with the state of the user and the external information, wherein the pseudo-emotions are controlled by the pseudo-personality, and the pseudo-personality is different depending on the user, i.e., the pseudo-personality unique to each user is being established in accordance with the use of the system. Since the pseudo-personality is expressed as the pseudo-emotions, the user can enjoy fostering a unique assist system during a growth period, similar to raising a child. Further, approximately after completion of the growth period, the user can enjoy establishing "friendship" with the assist system.

Further, the system is constituted so as to generate autonomous behavior based on the pseudo-personality and the pseudo-emotions controlled by the pseudo-personality. Thus, the more the system is used, the more the understanding of the user's feelings or preferences can be achieved. The system can assist the user in matters which the user does not directly request.

Further, since the assist system can perform both autonomous behavior and commanded behavior, the user need not give detailed commands from the beginning. The user can set conditions through dialogue between the system and the user. In addition, during the dialogue, the assist system can give its own suggestions (such as newly released information). Thus, an appropriate action plan can be established very easily with the assist system.

Pet Robot

With reference to FIGS. 11–19, another embodiment to which the control system of the present invention is adopted will be explained. This embodiment is a pet robot which a user can keep as a pet.

Incidentally, as can be seen in FIGS. 11–19, the control system of the pet robot is almost the same as that in the assist system, except that the details of information at each processing unit, output devices, and the details of output information are different. Thus, the principle of the control system will not be explained again to avoid repetition. The different aspects from the assist system will be explained below.

The pet robot is designed to give a user para-experience of keeping a pet. The pet robot itself has a pseudo-personality, which grows by interacting with the user and through its own experience, and pseudo-emotions, which change in accordance with interaction with the user and the surrounding environments. Depending on the state of the pseudo-personality and the pseudo-emotions, the pet robot expresses emotions and responds to the user with autonomous response and/or commanded response. As a result, the pet robot is capable of conducting various actions.

In practice, in order to recognize the state of the user or the environments, this pet robot is equipped with a visual detection sensor, a touch detection sensor, a hearing-detection sensor, and a means for accessing external databases, and further equipped with an output device, such as a visual output device and an auditory output device, for indicating its pseudo-emotions or responses to the user, and further with traveling means functioning as its hands and feet, an operation device, and a tail.

Basic Structures of Pet Robot

Figure 11:
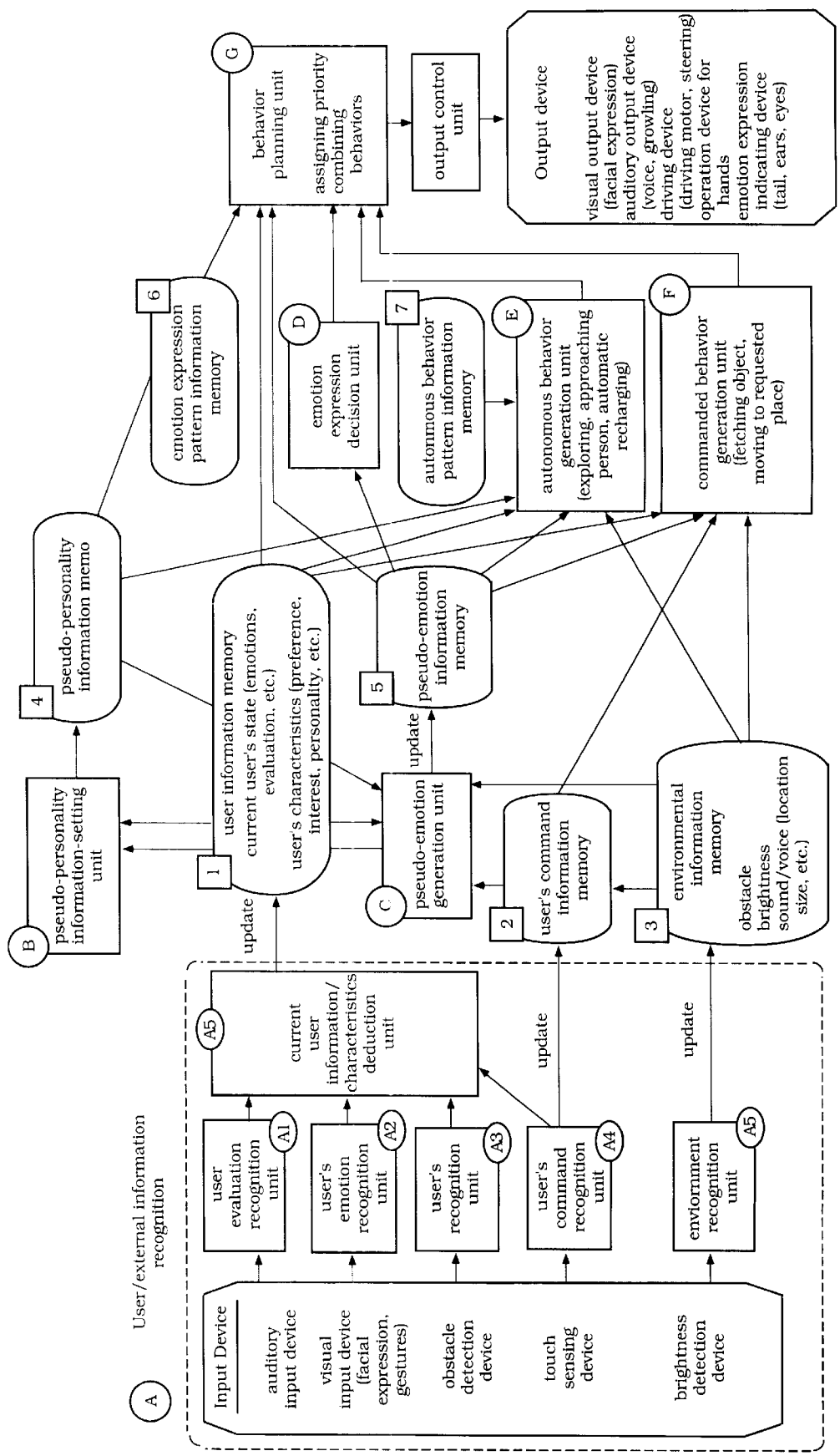
FIG. 11 is a schematic block diagram showing an example of the entire system of a pet robot according to the present invention.
Figure 12:
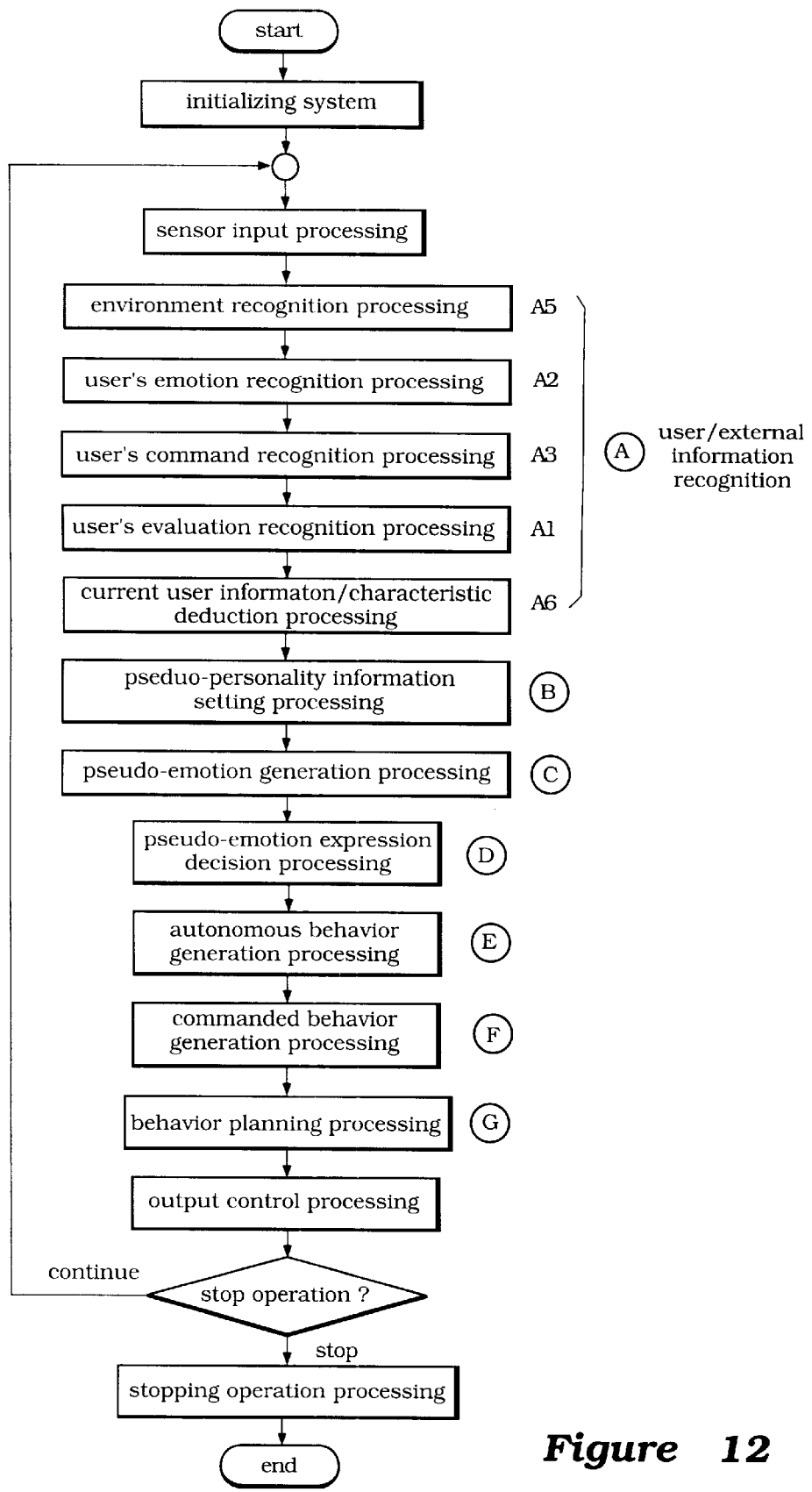
FIG. 12 is a schematic flow chart showing the entire system of the pet robot according to the present invention.

FIG. 11 is a schematic block diagram showing an example of the entire system of a pet robot according to the present invention. As shown in this figure, the pet robot comprises: a user/environment information recognition unit A for recognizing a state of the user or environment information; a pseudo-personality information-setting unit B for setting a pseudo-personality by referring to the outcome of recognition by the recognition unit A; a pseudo-emotion generation unit C for generating pseudo-emotions based on the outcome of recognition by the recognition unit A and the information on the pseudo personality set by the pseudo-personality information-setting unit B; an emotion expression decision unit D for deciding manners of emotion expression, such as expression methods to express laughing or angry on a display, based on the information on the pseudo-emotion; an autonomous behavior generation unit E for generating autonomous behavior based on the outcome of recognition, the information on the pseudo-personality, and the information on the pseudo-emotions; a commanded behavior generation unit F for generating behavior in accordance with the user's command based on the outcome of recognition and at least the preceding behavior previously outputted by this system itself; and a behavior planning unit G for deciding final behavior to be outputted using output from each of the emotion expression decision unit D, the autonomous behavior generation unit E, and the commanded behavior generated unit F, based on the outcome of recognition, the information on the pseudo-personality, and the information on the pseudo-emotions. As shown in FIG. 12, once the system is activated, this assist system repeats each processing step at units A through G until the system is turned off. The structure and function of each unit will be explained in detail below.

User/Environment Information Recognition Unit

As shown in FIG. 11, the user/environment information recognition unit A comprises various input devices (e.g., an auditory input device, a visual input device, a touch detection device, and/or an environment information detection device), a user's evaluation recognition unit A1, a user's emotion recognition unit A2, a user recognition unit A3, a user's command recognition unit A4, an environment information recognition unit A5, and a current user information/characteristics deduction unit A6. The user's evaluation recognition unit A1 performs recognition-processing based on the information obtained via the input devices. The current user information/characteristics deduction unit A6 determines or deduces a current state of the user and the user's characteristics such as the user's preferences based on the recognition outcome from the user-related recognition units A1 through A3.

In the above, the input device includes a microphone as an auditory input device, a camera as a visual input device, a tactile sensor as a touch detection device, and an illumination sensor, a voltage sensor, an obstacle-sensing sensor, and a drive-sensing sensor (sensing a distance driven by a drive device as an environment information detection device. However, the input devices are not limited to the above. Any input device can be used which is available on the market, and which is capable of detecting the user's state and environment information visually, auditorily, and/or tactilely.

Figure 13:
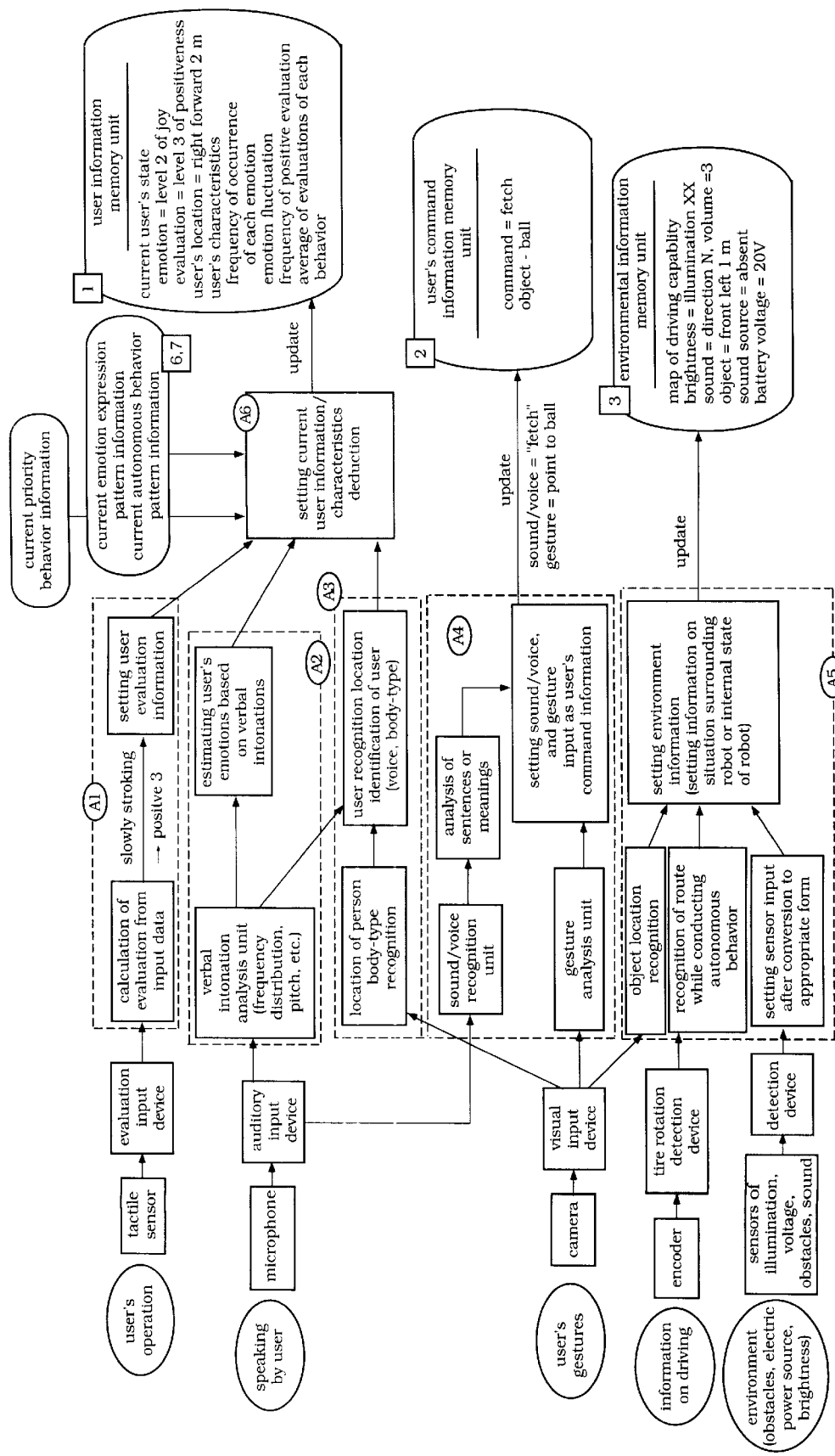
FIG. 13 is a schematic block diagram showing the user/environment information recognition unit A indicated in FIG. 11.

FIG. 13 is a schematic block diagram showing the user/environment information recognition unit A in detail to explain processes at each of the processing units A1 through A6 in the user/environment information recognition unit A.

As shown in this figure, the user's evaluation recognition unit A1 establishes the user's evaluation as to behavior outputted by the pet robot and sets the result, for example, as information on the user's evaluation, based on the manner in which the user responds to the pet robot. The manner may be sensed by a tactile sensor, e.g., how the user touches or strokes the pet robot. If the manners of touching or stroking are correlated with evaluation values in advance, the evaluation values can be determined.

The user's emotion recognition unit A2 presumes the user's current emotions based on the characteristics found in the auditory information and the user's facial expression, wherein an auditory analysis (analysis of frequency distributions or pitches of the sound/voice) and a facial expression analysis (analysis based on the shapes of the eyes and the mouth) are conducted based on the auditory information and the user's facial expression inputted from the auditory input device and the visual input device. Further, based on the presumed emotions, the user's emotion recognition unit A2 determines the user's current emotion.

The user recognition unit A3 recognizes whether the person detected by the pet robot is the user, based on the outcome of recognition of the position of the person and the body-type of the person by using a visual input device, and based on the outcome of analysis of the sound/voice obtained at the user emotion recognition unit A2.

The user's command recognition unit A4 recognizes and establishes the user's command information based on command information obtained by analyzing the meaning of the sound/voice recognized by the auditory input device and by analyzing information on the user's gestures recognized by the visual input device. For example, if the user says "fetch" and "points out a ball" with his/her gesture, based on a combination, the user's command information is set as follows: The command is "fetching" and the object is "the ball".

The environment information recognition unit A5 recognizes the location of an object based on information obtained from the visual input device; recognizes the travelling route of the pet robot when travelling autonomously, based on information obtained from the drive-sensing sensor of the drive device; converts information, such as brightness, the presence or absence of an obstacle, and the electrical power level of the pet robot, obtained from various detection sensors, to appropriate forms; sets the converted information; and, based thereon, sets information on the environments surrounding the pet robot and the internal state of the pet robot.

The current user information/characteristics deduction unit A6 determines or deduces the current state and the characteristics of the user based on the recognition results at the user-related information recognition units A1 through A4, the information on the current priority behavior described later, the information on the emotion expression patterns, and the information on the autonomous behavior patterns. The current user information/characteristics deduction unit A6 then updates data of the recognition information related to the user stored in a user information memory 1.

In the above, the current state of the user includes the level of the user's emotions, the user's evaluation as to the behavior outputted by the system, and the location of the user. The characteristics of the user includes frequency of the occurrence of each emotion, the change rate or range of emotions, and the average value of user's evaluation as to the behavior outputted by the system.

The output of the user's command recognition unit A4 is transmitted to a user's command information memory 2, thereby updating the information related to the user's command stored in the memory 2. The information related to the user's command includes, for example, the contents of the command, the object of the command, and the conditions of the command.

The output of the external information recognition unit A5 is transmitted to an external information memory 3, thereby updating the information stored in the memory 3.

Pseudo-Personality Information-Setting Unit

Figure 14:
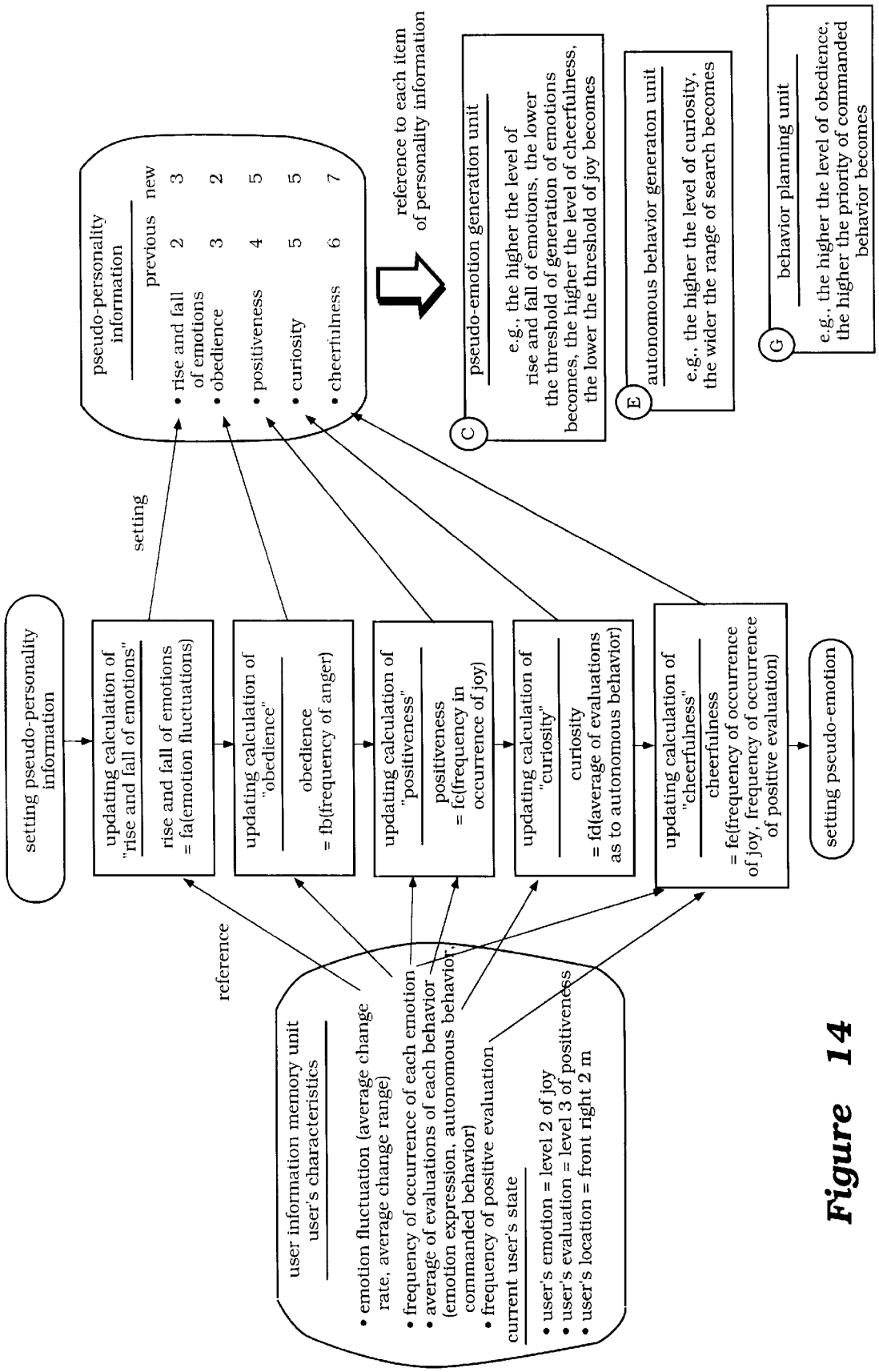
FIG. 14 is a schematic flow chart showing processes at the pseudo-personality information-setting unit B indicated in FIG. 11.

FIG. 14 is a schematic flow chart showing processes at the pseudo-personality information-setting unit B.

The pseudo-personality information-setting unit B is constructed so as to set, as a pseudo-personality, a group of several preliminary personalities, each subdividable into several levels. Based on the information stored in the user information memory 2, the level of each preliminary personality is set, and the higher the level, the more the preliminary personality contributes to the formation of the pseudo-emotions and the action plan.

As can be seen, processes at the pseudo-personality information-setting unit B are substantially the same as those in the assist system. The details of the processes are therefore omitted.

Pseudo-Emotion Generation Unit

Figure 15:
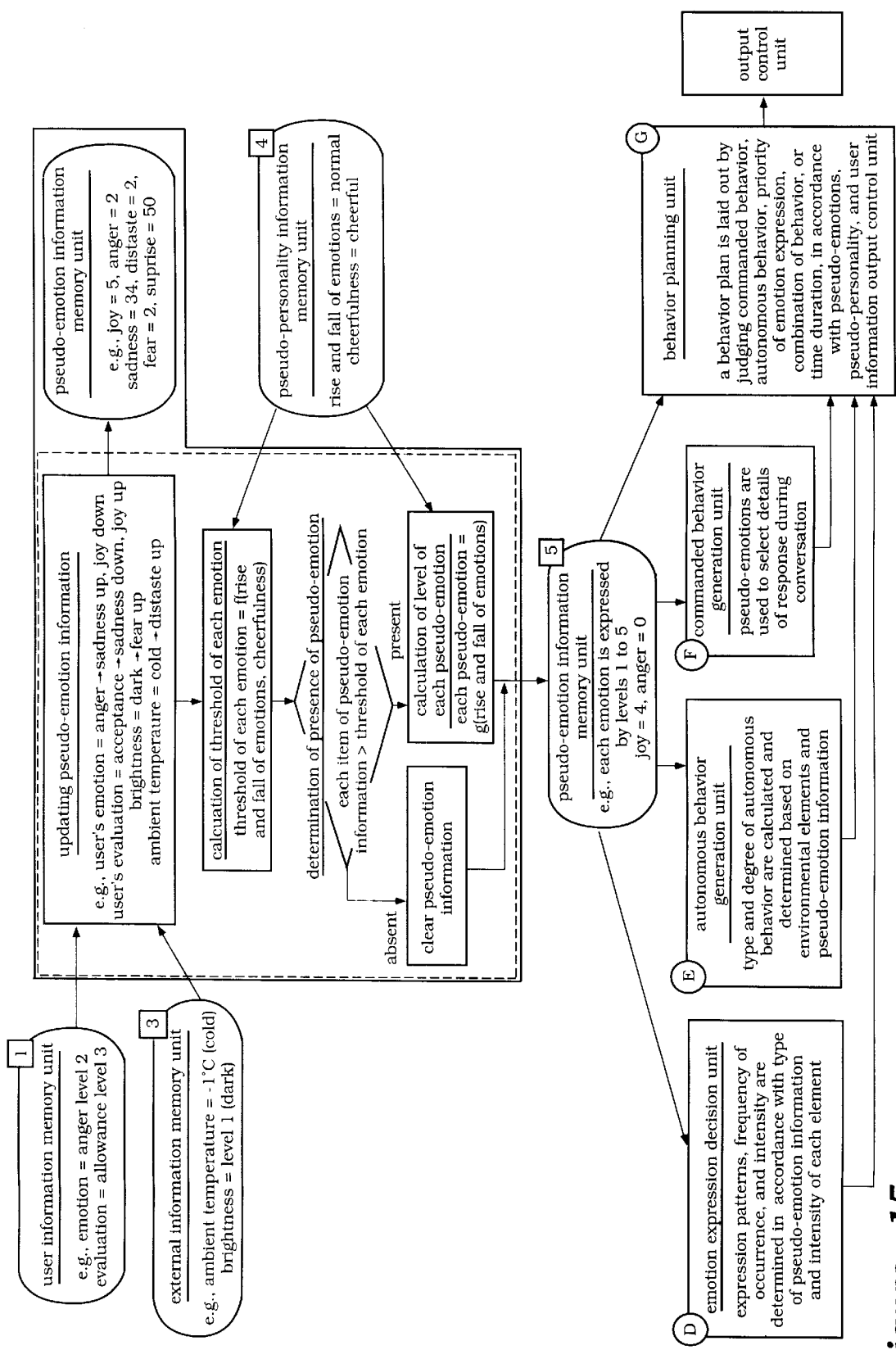
FIG. 15 is a schematic flow chart showing processes at the pseudo-emotion generation unit C indicated in FIG. 11.

FIG. 15 is a schematic flow chart showing processes at the pseudo-emotion generation unit C.

The pseudo-emotion generation unit C receives output from the user information memory 1, the external information memory 3, and the pseudo-personality information memory 4, and, based on the above information, the pseudo-emotion generation unit C generates pseudo-emotion information of the system.

As can be seen, processes at the pseudo-emotion generation unit C are substantially the same as those in the assist system. The details of the processes are therefore omitted.

Emotion Expression Decision Unit

Figure 16:
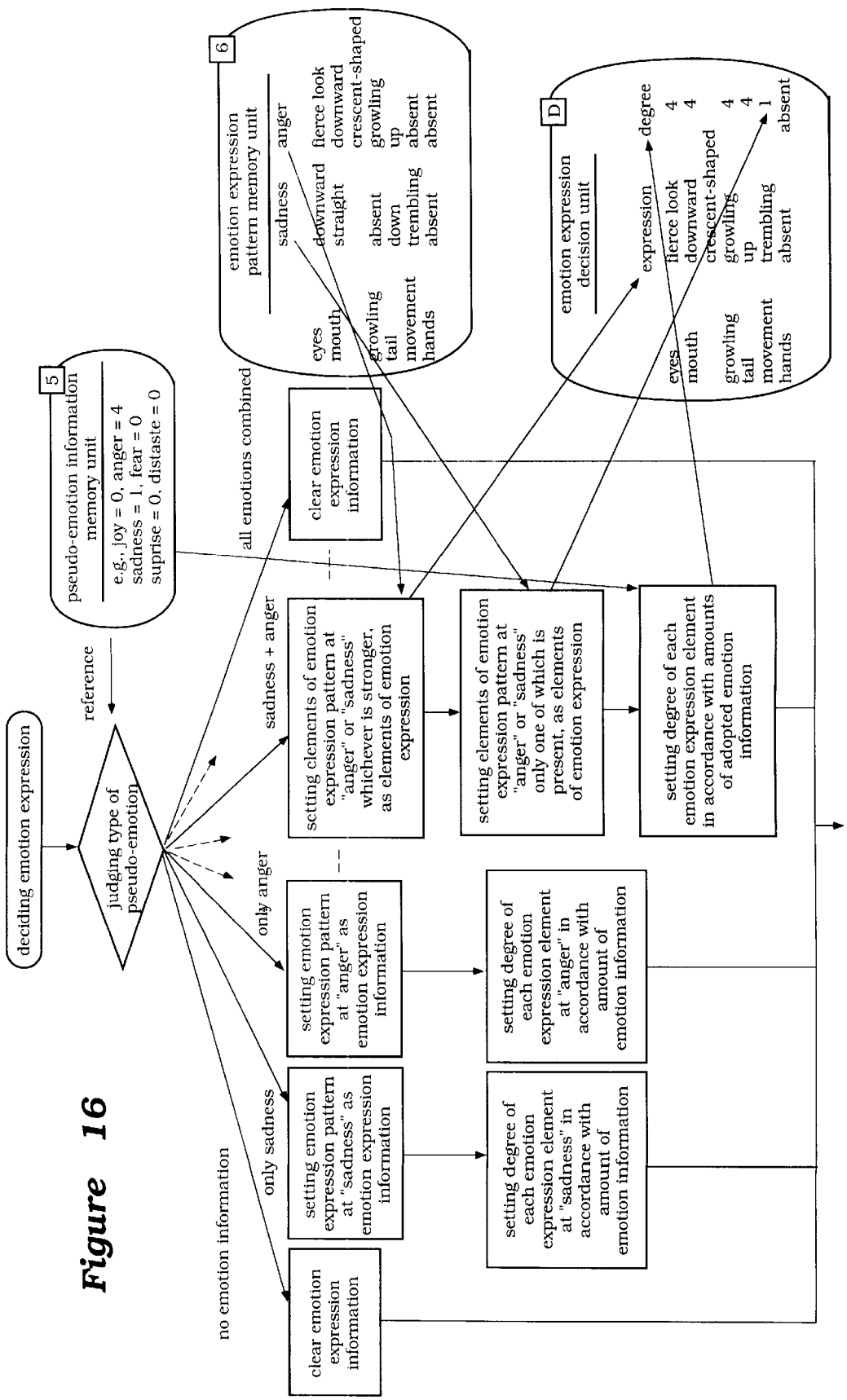
FIG. 16 is a schematic flow chart showing processes at the emotion expression decision unit D indicated in FIG. 11.

FIG. 16 is a schematic flow chart showing processes at the emotion expression decision unit D.

The emotion expression decision unit D judges the level of each preliminary emotion from the pseudo-emotion information obtained from the pseudo-emotion memory 5, and determines emotion expression to be outputted based on preliminary emotions whose levels are high or more than zero.

The emotion expression is selected from plural patterns of emotion expression in relation to pseudo-motions stored in advance in an emotion expression pattern memory 6. The emotion expression includes, in practice, changes in shape of parts such as eyes and a mouth if a "face" is created by a visual output device. Further, emotion expression can be indicated by movement of a tail or the pet robot itself. In the above, the emotion expression pattern memory 6 memorizes in advance patterns of each of parts of "face", and patterns of movement of the tail or the pet robot itself in relation to each level of each preliminary emotion.

The method of selecting the patterns of the emotion expressions at the emotion expression unit D can be simply a method wherein the pattern of the emotion expression, which corresponds to the preliminary emotion having the highest level, is selected. However, preferably, a pattern of the absence of expression (expressionless) is created among patterns of emotion expressions, and if the levels of all of the preliminary emotions are zero, the expressionless pattern is selected, and if the levels of preliminary emotions, except for one preliminary emotion, are zero, a pattern corresponding to the one preliminary emotion is selected. If the levels of more than one but not all preliminary emotions are more than zero, a pattern of a preliminary emotion having a higher level than those of the other preliminary emotions has priority over the other patterns. Further, among the remaining patterns, a pattern of a preliminary emotion having a lower level than the first one is selected where the first pattern does not apply. In the above, the first pattern and the second pattern are combined to make one combined expression. If the levels of all of the preliminary emotions are more than zero, the expressionless pattern may be selected. Accordingly, the pseudo-emotions can be indicated in a complex manner.

The emotion expression decision unit D determines emotion expression patterns from the pseudo-emotions at the moment in the above-described manner, sets the patterns as emotion expression behavior, and outputs them to the behavior planning unit G.

Autonomous Behavior Generation Unit

Figure 17:
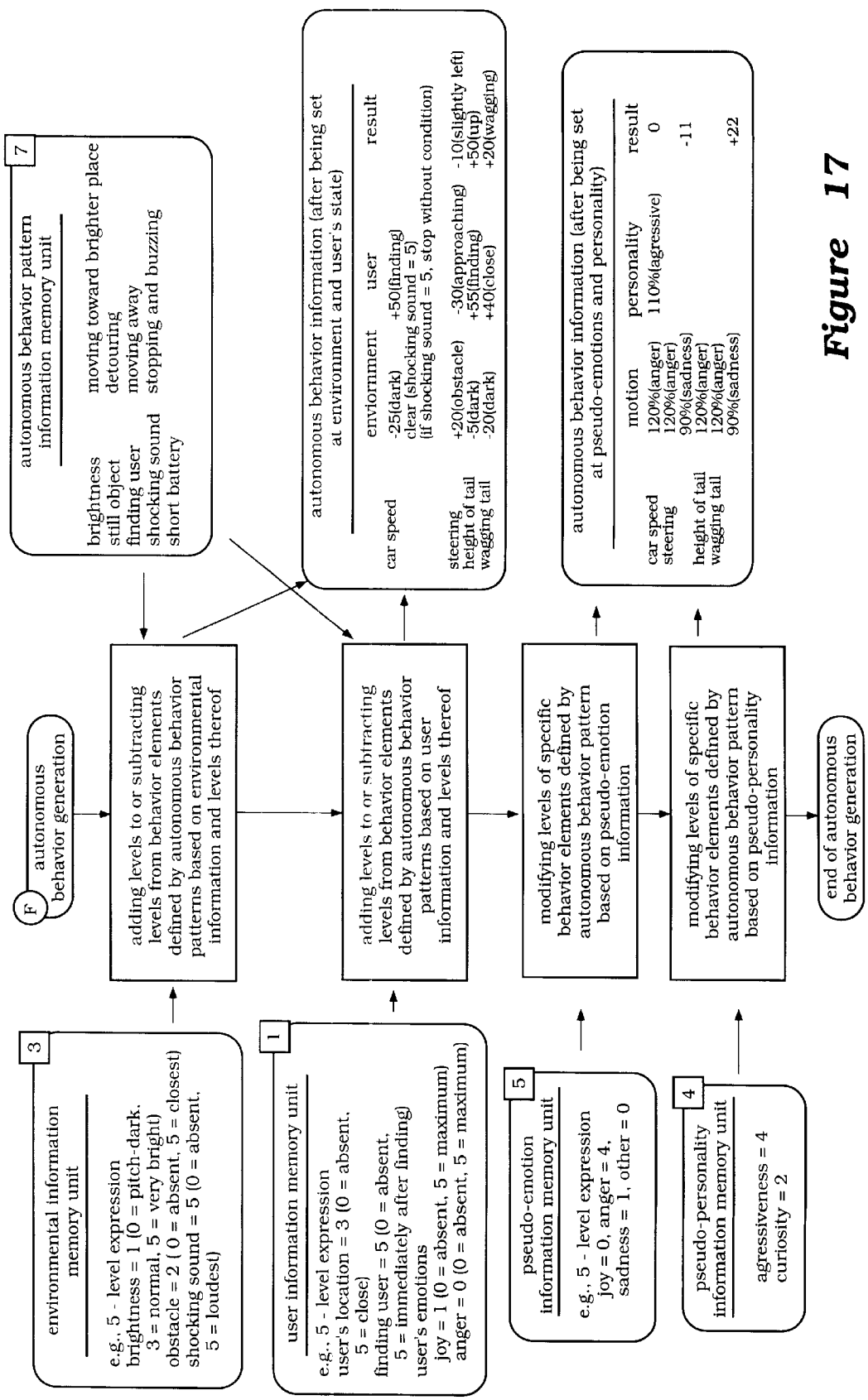
FIG. 17 is a schematic flow chart showing processes at the autonomous behavior generation unit E indicated in FIG. 11.

FIG. 17 is a schematic flow chart showing processes at the autonomous behavior generation unit E.

The autonomous behavior generation unit E determines each action level of plural itemized autonomous behaviors set in an autonomous behavior pattern memory 7 based on each level of the environment information, the user information, the pseudo-emotion information, and the pseudo-personality information, in order to determine a degree of priority of each itemized autonomous behavior. In the above, each of the environment information, the user information, the pseudo-emotion information, and the pseudo-personality information is subdivided into plural levels.

In this embodiment, the itemized autonomous behavior patterns are prepared for all of changeable or movable parts (such as the eyes, the mouth, voices, the height of the end of the tail, the movement of the tail, and the travelling of the pet robot itself). Each itemized autonomous behavior is correlated with the levels of each item of information. By adding or subtracting action levels of each itemized autonomous behavior based on the level of each item of information, the action level of each itemized autonomous behavior is determined.

Commanded Behavior Generation Unit

The commanded behavior generation unit F generates commanded behavior by using information from the environment information memory 3 in accordance with the user's command included in the user's command information. In practice, in this embodiment, if the user's commanded information is (command: fetching; object: ball), the unit F generates behavior information including recognition of the location of the ball based on information from the environment information memory, moving to the location, fetching the ball, and returning to the user.

Behavior Planning Unit

The behavior planning unit G receives behavior information from each of the emotion expression decision unit D, the autonomous behavior generation unit E, and the commanded behavior generation unit F; sets degrees of priority at each item of behavior information based on the pseudo-personality information, the pseudo-emotion information, and the user information; generates new priority behavior information; combines each item of behavior information based on the new priority behavior information having priority; and decides final output behavior.

Figure 18:
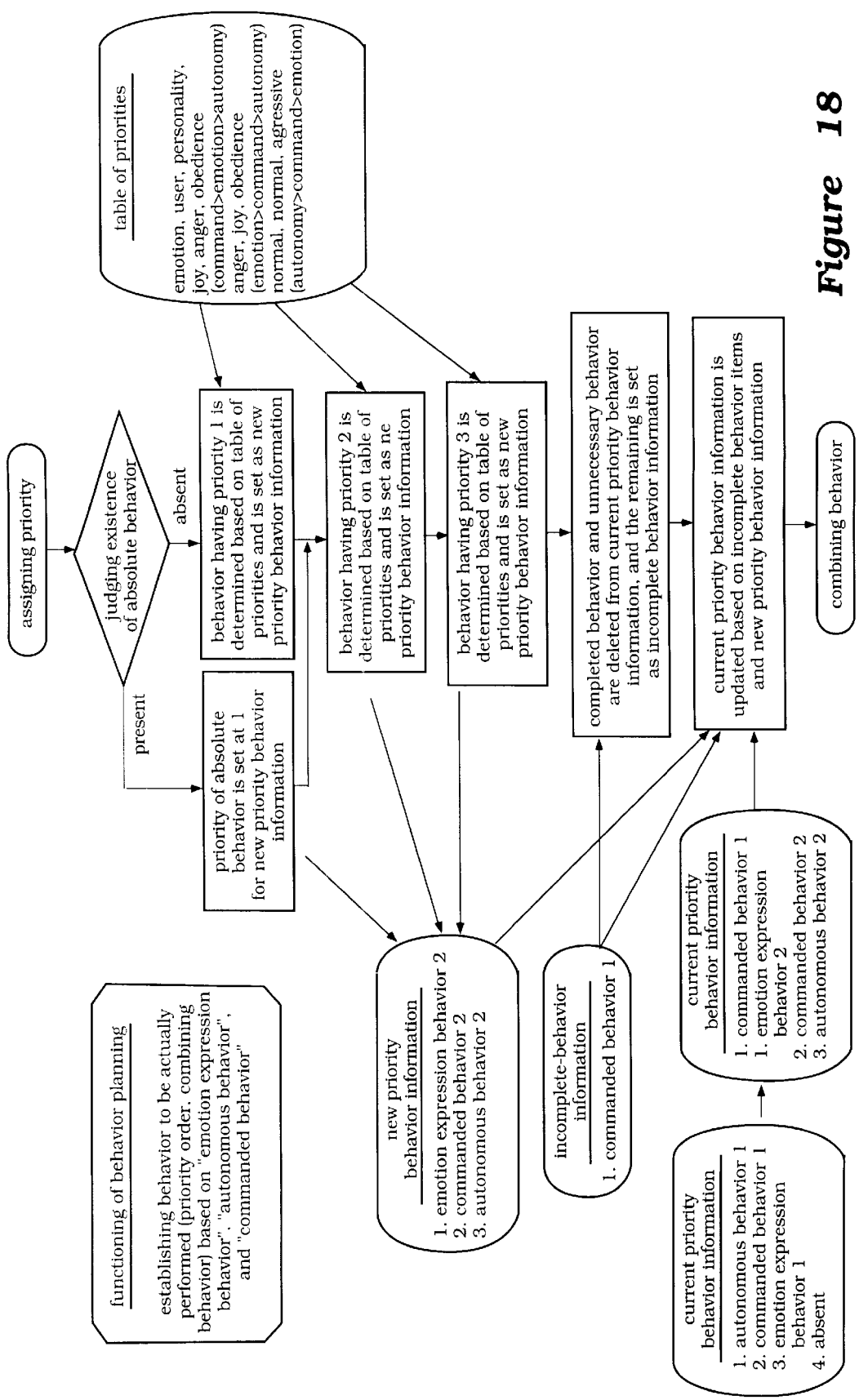
FIG. 18 is a schematic flow chart showing processes at the behavior planning unit G indicated in FIG. 11.
Figure 19:
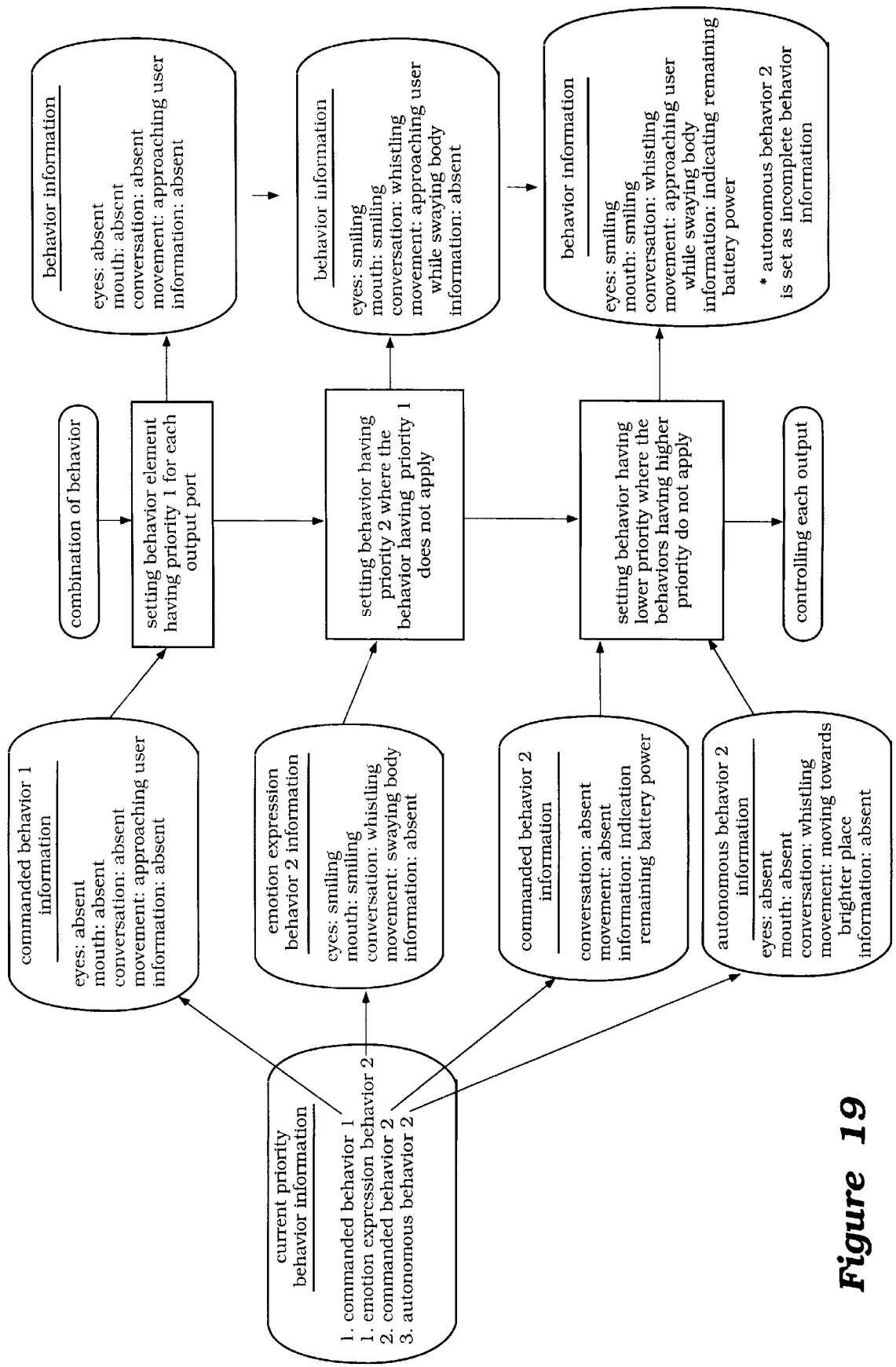
FIG. 19 is a schematic flow chart showing processes from generation of each item of behavior information based on the current behavior information to setting of final output behavior.

FIGS. 18 and 19 are schematic flow charts showing processes at the behavior planning unit G.

The behavior planning unit G first judges whether or not there is required absolute behavior. At this time, if there is required absolute behavior, the absolute behavior information is set at priority 1. The absolute behavior information includes information on behavior requiring urgent action against a situation such as battery power shortage and arrest by collision. The conditions corresponding to the absolute behavior are memorized in the behavior generation unit G.

As the result of judgement as to whether there is required absolute behavior, if there is no required absolute behavior, a degree of priority (1 to 3: in this case, priority is 1, i.e., high priority) is determined for each item of behavior information based on a table of degrees of priority, and is set as new priority behavior information.

The table of degrees of priority is a table defining degrees of priority as described in FIG. 18, for example: If the pseudo-emotion is "joy", the pseudo-personality is "obedience", and the state of the user is "anger", the commanded behavior is set at priority 1, the emotion expression behavior is set at priority 2, and the autonomous behavior is set at priority 3. As above, the table is a group of data wherein a degree of priority of each item of behavior information is set for a combination of all pseudo-emotions, all pseudo-personalities, and all user's states. However, the method of determining the degree of priority is not limited to the above, and includes, for example, fuzzy logic technique using fuzzy rules which define in advance the relationship between the pseudo-emotions, the pseudo-personalities, the user's states, and the degrees of priority of behavior information, wherein membership equations of behavior information are formulated with respect to the degrees of priority.

After setting the new priority behavior information, the behavior which has already been performed and the behavior which need not be performed are deleted, and the remaining behavior patterns are set as incomplete behavior information. This incomplete behavior information is set to be more important than the aforesaid new priority behavior information. Based on the incomplete behavior information and the new priority behavior information, the current priority behavior information is updated. Each item of behavior information is combined based on the current priority behavior information.

FIG. 19 is a schematic flow chart showing processes from generation of each item of behavior information based on the current behavior information to setting of final output behavior.

Composite behavior is created by setting a behavior having a higher degree of priority first. That is, each item of behavior information is composed of plural behaviors, and in this embodiment indicated in FIG. 19, the behavior information of this embodiment includes any of the following: eyes, mouth, conversation, travelling, and information. In the order of priority, behaviors in the behavior information are set, and a behavior in the behavior information having lower priority is set only when there is no conflict with the behaviors already defined by the higher priority behavior information, i.e., the behaviors which the high priority behavior information does not define can be filled with those in the lower priority behavior information.

In the embodiment indicated in FIG. 19, the behavior (travelling: approaching the user) defined by the commanded behavior which has the highest priority is set first. Second, the behavior defined by the emotion expression behavior having priority 2 (eyes: smiling eyes; mouth: smiling mouth; conversation: whistling; travelling: swaying the body) is set. Third, the behavior defined by the commanded behavior having priority 3 (information: indicating the remaining battery power level) is set. Fourth (last), the behavior defined by the autonomous behavior having priority 4 (conversation: whistling; travelling: moving to a brighter place) is set. As can be seen in the above example, although the autonomous behaviors having priorities 1, 2, and 4 have information on "travelling", only the information on "travelling" in the behavior having priority 1 is employed, and the information on "travelling" in the behavior having lower priorities is not adopted. In the above, the reason that there are two commanded behaviors with regard to "travelling" in the above example is that "commanded behavior information" in the previous incomplete behavior was maintained, i.e., the previous incomplete behavior information is assigned priority.

Effects

As described above, according to this system, the pet robot itself is equipped with a pseudo-personality, which grows by interacting with the state of the user, and pseudo-emotions, which change in accordance with the state of the user and the environment information, wherein the pseudo-emotions are controlled by the pseudo-personality, and the pseudo-personality is different depending on the user, i.e., the pseudo-personality unique to each user is being established in accordance with the use of the pet robot. Since the pseudo-personality is expressed as pseudo-emotions, the user can enjoy fostering a unique pet robot during a growth period, similar to raising a child. Further, approximately after completion of the growth period, the user can enjoy establishing "friendship" with the pet robot.

Further, the pet robot is constituted so as to generate autonomous behavior based on the pseudo-personality and the pseudo-emotions controlled by the pseudo-personality. Thus, the more the pet robot is used, the more the personality of the pet robot is established, thereby allowing the pet robot to behave in various manners.

Further, since the pet robot can perform both autonomous behavior and commanded behavior, the pet robot will never be completely delinquent nor completely obedient. Various actions of the pet robot keep the user interest in the pet robot.

Technical Options

A robotics platform suitable for mobile navigation tasks can be designed to provide on-board audio/video capabilities and a radio link to an off-board computer. Existing techniques for color tracking to track the user's hands and head location can be adapted. Existing word spotting speech recognition software for recognizing simple one- or two-word spoken commands can also be adapted. Any methods for simple non-verbal audio analysis, such as verbal intonation analysis to recover the affective or emotion content of a command can be adapted. Existing schema-based reactive navigation methods can be adapted to provide the system with the capability of navigating around its environment without colliding with obstacles. In the above, exploration behaviors as well as goal seeking behaviors for moving to specific destinations can be encoded. Further, "reasoning" capabilities and a repertoire of behaviors can be formed with an appropriate decision-making algorithm that takes into account the system's goals and goal priorities, the current environment or situation, and user's goals and emotion state, for example. Finally, any algorithms can be adapted for adapting the system's behavior in response to unexpected situations, for learning new behaviors, for learning the environment, and for learning about the user's preferences. The functioning of the system can be organized by, for example, expanding a behavior-based subsystem (responsible for "low-level" interaction of the system with the environment) with high-level processing modules (responsible for "high-level" interaction of the system with the user) that work in parallel.

Further, correlations between various information and various variables can be determined in advance using existing techniques such as neural networks, fuzzy neural networks, and genetic algorithms if the correlations are highly complex, or using existing techniques such as maps and functional equations if the correlations are rather simple. In this regard, Da Ruan (editor)"lntelligent Hybrid Systems—Fuzzy Logic, Neural Networks, and Genetic Algorithms—" Kluwer Academic Publishers (1997), J.-S. R. Jang, C.-T. Sun, E. Mizutani,"Neuro-Fuzzy and Soft Computing" Prentice Hall Upper Saddle River, N.J. 07458 (1997), C.-T. Lin and C. S. George Lee, "Neural Fuzzy Systems" Prentice Hall Upper Saddle River, N.J. 07458 (1998), and N. K. Kasabov, "Foundations of Neural Networks, Fuzzy Systems, and Knowledge Engineering" the MIT Press (1996) are hereby incorporated by reference. The above techniques can be combined, and learning control can be adapted for any techniques.

Other Applications

The object to be controlled in the present invention is not limited, and any objects, as in the first and second embodiments, such as an engine in a motorbike or a car, an outboard engine in a vessel, an industrial robot used in machine tools, a motor used in electrically-riven vehicles, or the like can be controlled by adopting the control system of the present invention based on the same principle as in the aforesaid embodiments. Incidentally, the external information or environment information can be omitted if the object is used under limited circumstances or if the external or environment information has nothing to do with accomplishment of the user's command or if the user so desires.

When the present invention is adapted to a control object in a different field or for a different purpose, by modifying items included in information to be processed, the control object can be controlled as with the aforesaid embodiments. In any case, according to the present invention, the control object, to which the present invention is adapted, is likely to be equipped with quasi-intelligence.

It will be understood by those of skill in the art that numerous variations and modifications can be made without departing from the spirit of the present invention. Therefore, it should be clearly understood that the forms of the present invention are illustrative only and are not intended to limit the scope of the present invention.

What is claimed is:

1. An autonomous device behaving adaptively to a user, comprising:

a sensing unit which senses signals of a user's command and predetermined user-related signals relevant to accomplishment of the command but not part of the command;

a recognition unit which recognizes the user's command and a current user-related status based on the sensed signals of the command and the sensed predetermined signals;

a first memory which stores the recognized command and the recognized user-related status;

a pseudo-personality-forming unit which establishes each element of predetermined pseudo-personality elements based on the user-related status accumulated for a predetermined period of time in the first memory to form pseudo-personality, said pseudo-personality-forming unit memorizing a predetermined relationship between the predetermined pseudo-personality elements and the user-related status;

a second memory which stores the formed pseudo-personality;

a pseudo-emotion-forming unit which establishes each element of predetermined pseudo-emotion elements based on the user-related status stored in the first memory and the pseudo-personality stored in the second memory to form pseudo-emotions, said pseudo-emotion-forming unit memorizing a predetermined relationship between the predetermined pseudo-emotion elements, the user-related status, and the pseudo-personality;

an autonomous behavior-establishing unit which selects a pattern of autonomous behavior based on the user-related status, the pseudo-personality, and the pseudo-emotions, said autonomous behavior-forming unit memorizing a predetermined relationship between patterns of autonomous behavior, the user-related status, the pseudo-personality, and the pseudo-emotions;

a commanded behavior-establishing unit which constitutes a pattern of commanded behavior in accordance with the recognized user's command;

a behavior control unit which controls behavior by combining the selected pattern of autonomous behavior and the constituted pattern of commanded behavior based on a predetermined priority order; and an output device which outputs the controlled behavior.

2. The autonomous device according to claim 1, wherein:

the sensing unit further senses predetermined user-unrelated signals relevant to accomplishment of the command but not part of the command;

the recognition unit further recognizes a current user-unrelated status based on the sensed predetermined signals;

the first memory further stores the recognized user-unrelated status;

the pseudo-emotion-forming unit establishes each element of predetermined pseudo-emotion elements based further on the user-unrelated status in addition to the user-related status stored in the first memory and the pseudo-personality stored in the second memory to form pseudo-emotions;

the predetermined relationship memorized in the pseudo-emotion-forming unit further includes the user-unrelated status to define a relationship between the predetermined pseudo-emotion elements, the user-related status, the user-unrelated status, and the pseudo-personality;

the autonomous behavior-establishing unit selects a pattern of autonomous behavior based further on the user-unrelated status in addition to the user-related status, the pseudo-personality, and the pseudo-emotions; and the predetermined relationship memorized in the autonomous behavior-forming unit further includes the user-unrelated status to define a relationship between patterns of autonomous behavior, the user-related status, the user-unrelated status, the pseudo-personality, and the pseudo-emotions.

3. The autonomous device according to claim 1, further comprising a third memory which stores the pseudo-emotion formed by the pseudo-emotion-forming unit, said third memory being linked to the behavior control unit, wherein the second memory is further linked to the behavior control unit, wherein the pseudo-emotion stored in the third memory and the pseudo-personality stored in the second memory are used as parameters of the predetermined priority order provided in the behavior control unit.

4. The autonomous device according to claim 2, further comprising a third memory which stores the pseudo-emotion formed by the pseudo-emotion-forming unit, said third memory being linked to the behavior control unit, wherein the second memory is further linked to the behavior control unit, wherein the pseudo-emotion stored in the third memory and the pseudo-personality stored in the second memory are used as parameters of the predetermined priority order provided in the behavior control unit.

5. The autonomous device according to claim 3, wherein the first memory is further linked to the behavior control unit, wherein the user-related status stored in the first memory, the pseudo-personality stored in the second memory, and the pseudo-emotion stored in the third memory are used as parameters of the predetermined priority order provided in the behavior control unit.

6. The autonomous device according to claim 4, wherein the first memory is further linked to the behavior control unit, wherein the user-related status stored in the first memory, the pseudo-personality stored in the second memory, and the pseudo-emotion stored in the third memory are used as parameters of the predetermined priority order provided in the behavior control unit.

7. A method for adapting behavior of a device to a user's characteristics, comprising the steps of:

(a) sensing signals of a user's command and predetermined user-related signals relevant to accomplishment of the command but not part of the command;

(b) recognizing the user's command and a current user-related status based on the sensed signals of the command and the sensed predetermined signals;

(c) storing and updating the recognized command and the recognized user-related status;

(d) establishing each element of predetermined pseudo-personality elements based on the user-related status accumulated for a predetermined period of time in step (c) to form pseudo-personality, with the use of a memory storing a predetermined relationship between the predetermined pseudo-personality elements and the user-related status;

(e) storing and updating the formed pseudo-personality, wherein updating takes place under predetermined conditions;

(f) establishing each element of predetermined pseudo-emotion elements based on the user-related status stored in step (c) and the pseudo-personality stored in step (e) to form pseudo-emotions, with the use of a memory storing a predetermined relationship between the predetermined pseudo-emotion elements, the user-related status, and the pseudo-personality;

(g) selecting a pattern of autonomous behavior based on the user-related status, the pseudo-personality, and the pseudo-emotions, with the use of a memory storing a predetermined relationship between patterns of autonomous behavior, the user-related status, the pseudo-personality, and the pseudo-emotions;

(h) constituting a pattern of commanded behavior in accordance with the recognized user's command;

(i) controlling behavior by combining the selected pattern of autonomous behavior and the constituted pattern of commanded behavior based on a predetermined priority order; and (j) outputting the controlled behavior.

8. The method according to claim 7, further comprising:

in step (a), sensing predetermined user-unrelated signals relevant to accomplishment of the command but not part of the command;

in step (b), recognizing a current user-unrelated status based on the sensed predetermined signals;

in step (c), storing and updating the recognized user-unrelated status;

in step (d), establishing each element of predetermined pseudo-emotion elements based further on the user-unrelated status in addition to the uaer-status status stored in step (c) and the pseudo-personality stored in step (e) to form pseudo-emotions, wherein the predetermined relationship stored in the memory further includes the user-unrelated status to define a relationship between the predetermined pseudo-emotion elements, the user-related status, the user-unrelated status, and the pseudo-personality;

in step (g), selecting a pattern of autonomous behavior based further on the user-unrelated status in addition to the user-related status, the pseud-opersonality, and the pseudo-emotions, wherein the predetermined relationship stored in the memory further includes the user-unrelated status to define a relationship between patterns of autonomous behavior, the user-related status, the user-unrelated status, the pseudo-personality, and the pseudo-emotions.

9. The method according to claim 7, further comprising the steps of storing and updating the pseudo-emotion formed in step (f), wherein the stored and updated pseudo-emotion and the pseudo-personality stored in step (e) are used as parameters of the predetermined priority order provided in step (i).

10. The method according to claim 8, further comprising the steps of storing and updating the pseudo-emotion formed in step (f), wherein the stored and updated pseudo-emotion and the pseudo-personality stored in step (e) are used as parameters of the predetermined priority order provided in step (i).

11. The method according to claim 9, wherein the user-related status stored in step (c), the pseudo-personality stored in step (e), and the stored and updated pseudo-emotion are used as parameters of the predetermined priority order in step (i).

12. The method according to claim 10, wherein the user-related status stored in step (c), the pseudo-personality stored in step (e), and the stored and updated pseudo-emotion are used as parameters of the predetermined priority order in step (i).

* * * * *

UNITED STATES PATENT AND TRADEMARK OFFICE
CERTIFICATE OF CORRECTION

PATENT NO. : 6,230,111 B1
DATED : May 8, 2001
INVENTOR(S) : Takashi Mizokawa

It is certified that error appears in the above-identified patent and that said Letters Patent is hereby corrected as shown below:

Column 22,
Line 44, delete "stores the recognized" and insert -- stores and updates the recognized --, therefor.
Line 55, delete "stores the formed pseudo-personality;" and insert -- stores and updates the formed pseudo-personality, wherein updating takes place under predetermined conditions; --, therefor.

Column 23,
Line 22, delete "stores the recognized" and insert -- stores and instantaneously updates the recognized --, therefor.
Lines 49 and 58, delete "stores the" and insert -- stores and updates the --, therefor.

Column 24,
Line 65, delete "uaer-status" and insert -- user related --, therefor.

Signed and Sealed this

Eleventh Day of October, 2005

JON W. DUDAS
*Director of the United States Patent and Trademark Office*